US012680389B1

(12) United States Patent
Baker

(10) Patent No.: US 12,680,389 B1
(45) Date of Patent: Jul. 14, 2026

(54) MULTI-FUNCTIONAL VEHICLE

(71) Applicants: Brent Stoker, Burley, ID (US); Marla Stoker, Burley, ID (US)

(72) Inventor: David B. Baker, Burley, ID (US)

(73) Assignees: Brent Stoker, Burley, ID (US); Marla Stoker, Burley, ID (US)

( * ) Notice: Subject to any disclaimer, the term of this patent is extended or adjusted under 35 U.S.C. 154(b) by 0 days.

(21) Appl. No.: 19/258,762

(22) Filed: Jul. 2, 2025

(51) Int. Cl.
 B60K 17/28 (2006.01)
 E21B 7/02 (2006.01)

(52) U.S. Cl.
 CPC ............... E21B 7/02 (2013.01); B60K 17/28 (2013.01)

(58) Field of Classification Search
 CPC .................................. E21B 7/02; B60K 17/28
 USPC ..... 173/1–2, 13, 18–20, 184, 25–31, 38–39, 173/45–53
 See application file for complete search history.

(56) References Cited

U.S. PATENT DOCUMENTS

| | | | | |
|---|---|---|---|---|
| 6,668,964 B2 * | 12/2003 | Braud | .................... | B60K 17/04 |
| | | | | 180/292 |
| 7,070,036 B2 * | 7/2006 | Fernandez | ............. | B60K 17/28 |
| | | | | 192/109 R |
| 7,404,341 B2 * | 7/2008 | Nishino | .................. | F16H 47/02 |
| | | | | 74/606 R |
| 9,067,493 B2 * | 6/2015 | Husson | .................. | B60K 17/28 |
| 2003/0153215 A1 * | 8/2003 | Gibbs | .................... | B60K 17/28 |
| | | | | 440/38 |

| | | | | |
|---|---|---|---|---|
| 2005/0224262 A1 * | 10/2005 | Ima | ........................ | B60K 17/22 |
| | | | | 180/53.6 |
| 2006/0070776 A1 * | 4/2006 | Morrow | ................. | B60K 17/28 |
| | | | | 180/65.1 |
| 2009/0018716 A1 * | 1/2009 | Ambrosio | ................. | B60L 7/14 |
| | | | | 903/906 |
| 2017/0198809 A1 * | 7/2017 | Omran | ................ | F16H 61/0204 |
| 2018/0056781 A1 * | 3/2018 | Lammers | ............... | B60K 25/06 |
| 2018/0056782 A1 * | 3/2018 | Lammers | .................. | F16H 3/54 |
| 2018/0222484 A1 * | 8/2018 | Shively | .................... | B60K 5/08 |
| 2018/0335025 A1 * | 11/2018 | Wilson | .................... | E04G 21/04 |
| 2019/0289771 A1 * | 9/2019 | Lang | ...................... | A01B 71/06 |
| 2021/0139246 A1 * | 5/2021 | Wilson | .................... | E04G 21/16 |
| 2022/0134856 A1 * | 5/2022 | Andringa | ............... | B60L 50/16 |
| | | | | 74/15.4 |
| 2022/0355881 A1 * | 11/2022 | Sidwell | .................. | B60K 25/02 |
| 2023/0104060 A1 * | 4/2023 | Voth | .................... | A01D 69/002 |
| | | | | 74/11 |
| 2024/0359555 A1 * | 10/2024 | Bessho | ................ | B60K 17/356 |
| 2025/0100373 A1 * | 3/2025 | Minamide | ............... | B60L 50/72 |
| 2025/0313084 A1 * | 10/2025 | Natarajan | ............. | B60K 17/02 |

FOREIGN PATENT DOCUMENTS

| | | | | | |
|---|---|---|---|---|---|
| EP | 3819150 A1 * | 5/2021 | ............. | B60K 13/04 |
| KR | 20010094460 A * | 11/2001 | ............. | B60K 17/28 |

* cited by examiner

*Primary Examiner* — Robert F Long
(74) *Attorney, Agent, or Firm* — Sanders IP Law

(57) ABSTRACT

A vehicle may include an engine configured to generate power. The vehicle may include rig equipment mounted to the vehicle and configured to obtain the power from the engine to operate the rig equipment. The rig equipment may be configured to perform subterranean operations. The vehicle may include a transmission configured to obtain the power from the engine to propel wheels of the vehicle. The vehicle may include a power distribution system coupled between the engine and the transmission and coupled between the engine and the rig equipment.

18 Claims, 12 Drawing Sheets

MULTI-FUNCTIONAL VEHICLE

FIELD

The embodiments discussed herein relate to a multi-functional vehicle.

BACKGROUND

Multi-functional vehicles may be configured to perform operations in addition to traditional driving operations. For example, multi-functional vehicles may include pump trucks, crane trucks, mixing trucks, vacuum trucks, and mobile drilling rigs, among other multi-functional vehicles. By combining driving operations and non-driving operations into a single vehicle, multi-functional vehicles may transport equipment to a location, operate the equipment, and then haul the equipment away from the location. As a result, multi-functional vehicles may provide access to remote locations such as farms or drill-sites, may reduce the footprint of the location where the non-driving operations are to be performed, and/or may enable quicker deployment and relocation without support vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of at least one embodiment, a vehicle may include an engine configured to generate power. The vehicle may include rig equipment mounted to the vehicle and configured to obtain the power from the engine to operate the rig equipment. The rig equipment may be configured to perform subterranean operations. The vehicle may include a transmission configured to obtain the power from the engine to propel wheels of the vehicle. The vehicle may include a power distribution system coupled between the engine and the transmission and coupled between the engine and the rig equipment.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
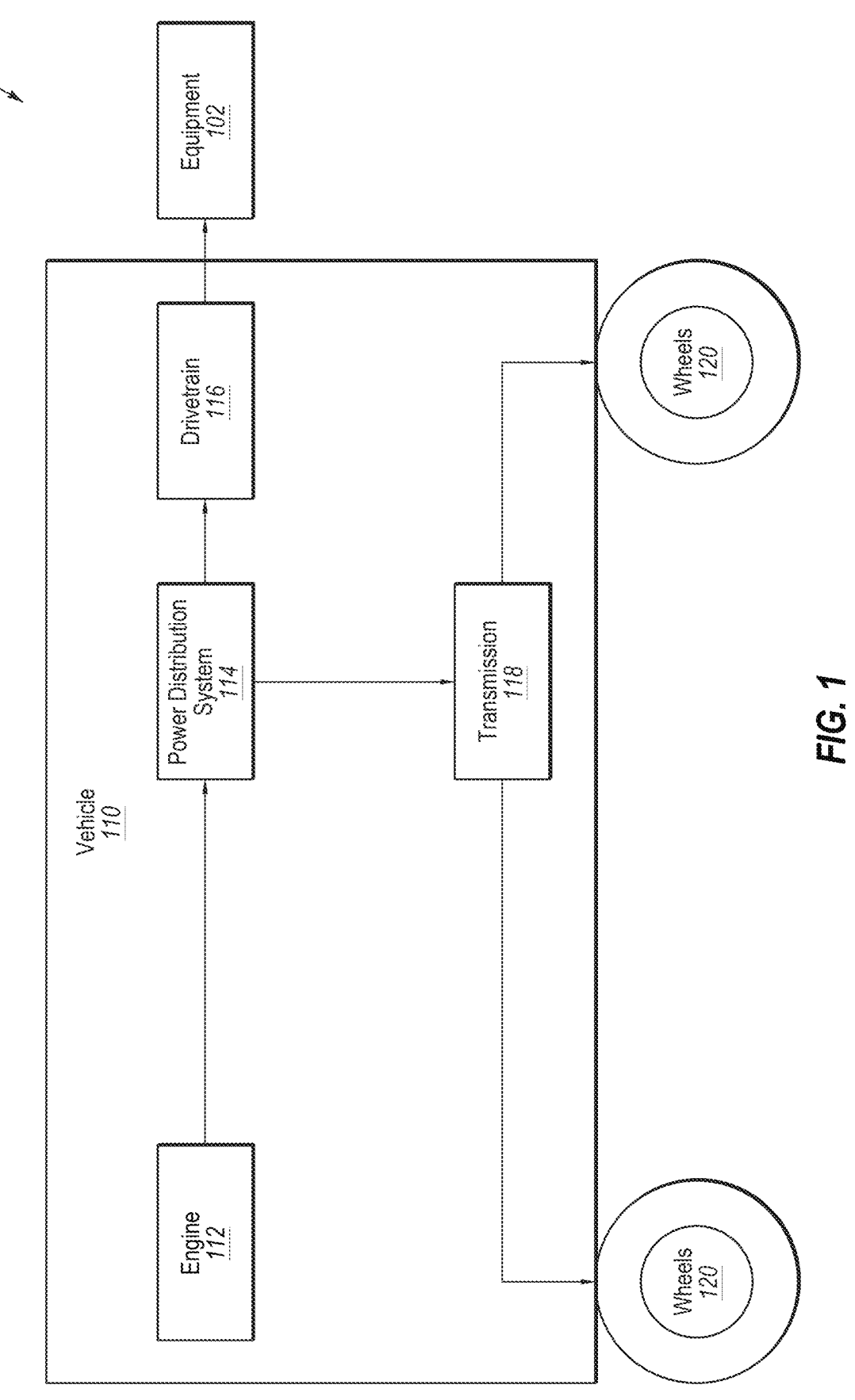
FIG. 1 illustrates a block diagram of an environment for multi-functional vehicle operation.

Multi-functional vehicles are typically constructed by modifying a base vehicle designed for transport (e.g., a truck) such that equipment may be mounted to the vehicle—thereby allowing the vehicle to perform operations beyond driving. As a result, multi-functional vehicles often inherit design aspects of the base vehicle, which are often designed based solely to perform driving operations. As a consequence, multi-functional vehicles often prioritize driving operations due to the pre-existing configurations of the base vehicle.

For example, a vehicle may be designed such that the engine and the transmission mounted are mounted below or low in the chassis to be more directly aligned with the drive axle, which reduces power losses when propelling the wheels during driving operations.

However, equipment used for non-driving operations may be mounted above the chassis. As a result, there may be more vector changes in the power distribution to the equipment than there is to the transmission and the drive axle causing driving operations to be more mechanically efficient than non-driving operations, and/or increasing power losses during non-driving operations. Additionally, due to the base vehicle configuration, preexisting mechanical devices of the base vehicle may be placed between the engine and the equipment, which may contribute to power losses when the engine is being used to power the equipment during non-driving operations. For example, the transmission may be directly coupled to the engine such that the power generated by the engine passes through the transmission to power the equipment during non-driving operations. In some instances, due to friction losses, the output power of the transmission may be 15% lower than the input power to the transmission, or more. Thus, even though the transmission may only be used in driving operations to propel the wheels, the transmission may still negatively impact the power distribution to the equipment during non-driving operations.

In some instances, multi-functional vehicles may spend more time performing non-driving operations than driving operations. For example, mobile rigs may spend a significant portion of operating time performing rig operations and not driving operations. For instance, the mobile rig may spend days, weeks, or even months at a particular location without ever being driven to a different location, and then, after finishing the rig operations at that particular location, the mobile rig may be driven to the next location where the mobile rig may spend days, weeks, or months before being driven to another location.

Thus, manufacturing a multi-functional vehicle from a base vehicle designed for transport may negatively impact non-driving operations. For example, fuel consumption may be increased during non-driving operations due to increased power losses attributable to the design aspects of the base vehicle (e.g., the engine being aligned with the transmission, the transmission being coupled directly to the engine, and/or power losses resulting from vector changes in non-driving operations). The increased fuel consumption may increase costs of performing non-driving operations and may negatively impact the environment. As another example, because the transmission may be in use in driving operations and in non-driving operations, the transmission may experience increased wear and/or premature failures. As a consequence, the non-driving operations may need to be shut down due to transmission maintenance or transmission repairs leading to unnecessary downtime.

In some circumstances, an additional engine may be used to address some of the challenges with multi-functional vehicles. For example, the multi-functional vehicle may include a second engine that is used only for non-driving operations and that is not coupled to the transmission. In these and other circumstances, the second engine may be used only for non-driving operations and the vehicle engine may be used only for driving operations. However, adding another engine may increase costs, increase the weight of the multi-functional vehicle, and/or lead to other operational complexities. For example, the increased weight may reduce the fuel efficiency of the multi-functional vehicle during driving, may increase road wear, may exceed gross vehicle weight ratings, and/or may require additional permits to be legally operated on the road.

The present application relates to a multi-functional vehicle configured to power equipment with a single engine while bypassing the transmission during non-driving operations. In particular, according to one or more embodiments of the present disclosure, a vehicle may include a drivetrain mounted to the vehicle and configured to operate equipment and an engine may be coupled to the drivetrain and configured to power the drivetrain. In these and other embodiments, a transmission may be selectively coupled with the engine so that the transmission only receives power from the engine during a driving mode of the vehicle. Accordingly, the engine may generate power, which may power the drivetrain and operate the equipment for non-driving operations, and during these operations the transmission may not receive power from the engine. Thus, the power losses experienced in traditional multi-functional vehicles due to the transmission may be negated, downtime may be reduced, and/or fuel consumption may be reduced.

Furthermore, in some embodiments, the engine may be mounted at or above the chassis resulting in less vector changes in distributing the power to the equipment during non-driving operations.

In another embodiment, the vehicle may include rig equipment mounted to the vehicle that may be operated from the power obtained from the engine. Rig equipment may include any equipment used to perform operations with respect to a wellbore used for extracting natural resources (e.g., a wellbore corresponding to a water well, a gas well, an oil well, a gas condensate well, a hydrogen well, a geothermal well, and/or other wells corresponding to natural resources). For example, rig equipment may include fluid handling equipment (e.g., pumps, compressors, mixers, agitators, and/or other fluid handling equipment), hoisting equipment (e.g., masts, drawworks, winches, booms, and/or other hoisting equipment), rotary equipment (e.g., top drives, rotary tables, and/or other rotary equipment), safety equipment, electrical equipment (e.g., generators), and/or support equipment (e.g., rig electrical systems), among other rig equipment. In some embodiments, the vehicle may include a power-distribution system coupled between the engine and the transmission and coupled between the engine and the rig equipment. In these and other embodiments, the power-distribution system may be configured to bypass the transmission when the vehicle is not performing driving operations. In some embodiments, the power distribution system may include a gearbox configured to transfer power to operate the rig equipment and, only during driving operations, to transfer at least a portion of the power generated by the engine to the transmission. In these and other embodiments, the gearbox may be configured to bypass the transmission when the vehicle is not performing driving operations such as when operating the rig equipment. Thus, the rig equipment may be operated with reduced power losses due to bypassing the transmission. The multi-function vehicle being used in conjunction with rig equipment is described in more detail with respect to FIGS. 7A-7C.

Turning to the figures, FIG. 1 illustrates a block diagram of an environment 100 for multi-functional vehicle operation. The environment 100 may be arranged in accordance with at least one embodiment described in the present disclosure. The environment 100 may include equipment 102 and a multi-functional vehicle 110 ("the vehicle 110"). In some embodiments, the vehicle 110 may include an engine 112, a power distribution system 114, a drivetrain 116, a transmission 118, and/or wheels 120, among other vehicle components. In some embodiments, the vehicle may include the equipment 102. For example, the equipment 102 may be mounted on the vehicle 110. Alternately or additionally, the equipment may not be mounted on the vehicle. In these and other embodiments, the vehicle 110 may be selectively coupled to the equipment 102.

In some embodiments, the equipment 102 may be subterranean equipment. Subterranean equipment may include all types of equipment that may be used in performing operations below the ground surface even where the equipment 102 itself is not below the ground surface. For example, subterranean equipment may include equipment 102 used for rig operations (e.g., drilling operations, tripping operations, and/or other wellbore operations), mining operations, earth-moving operations, cementing operations, boring operations, tunneling operations, construction operations, underground storage operations, among other subterranean operations. In these and other embodiments, the equipment 102 may include fluid handling equipment (e.g., pumps, compressors, mixers, agitators, and/or other fluid handling equipment), hoisting equipment (e.g., masts, drawworks, winches, booms, and/or other hoisting equipment), rotary equipment (e.g., top drives, rotary tables, and/or other rotary equipment), safety equipment, electrical equipment (e.g., generators), earth-moving equipment (e.g., an excavator), and/or support equipment, among other subterranean equipment. In some embodiments, subterranean equipment may include rig equipment, boring equipment, mining equipment, tunneling equipment, construction equipment, or underground storage equipment. For example, subterranean equipment may include pumps, compressors, mixers, agitators, masts, excavators, drawworks, winches, booms, top drives, rotary tables, or generators.

In these and other embodiments, the equipment 102 may include rig equipment. Rig equipment may include any equipment used to perform operations with respect to a wellbore used for extracting natural resources (e.g., a wellbore corresponding to a water well, a gas well, an oil well, a gas condensate well, a hydrogen well, a geothermal well, and/or other wells corresponding to natural resources). For example, rig equipment may include fluid handling equipment (e.g., pumps, compressors, mixers, agitators, and/or other fluid handling equipment), hoisting equipment (e.g., masts, drawworks, winches, booms, and/or other hoisting equipment), rotary equipment (e.g., top drives, rotary tables, and/or other rotary equipment), safety equipment, electrical equipment (e.g., generators), and/or support equipment (e.g., rig electrical systems), among other rig equipment.

In some embodiments, the equipment 102 may be heavy machinery equipment. For example, the equipment 102 may include earth-moving equipment (e.g. an excavator, a grader, a loader, a scraper, and/or other earth-moving equipment), hoisting equipment (e.g., a crane, a hoist, a drawworks, a boom lift, a manlift, a winch, and/or other hoisting equipment), subterranean equipment, pumping equipment, suction equipment, and/or mixing equipment, In some embodiments, heavy machinery equipment may consist of an excavator, a grader, a loader, a scraper, a crane, a winch, a pump, a compressor, a vacuum, a generator, a mixer, or an agitator.

In some embodiments, the vehicle 110 may be any vehicle capable of driving and operating the equipment 102 (e.g., a multi-functional vehicle). For example, the vehicle 110 may be a truck, SUV, a commercial vehicle, and/or any other vehicle capable of operating in a driving mode and operating the equipment 102. The "driving mode" of the vehicle 110 may include a state of the vehicle 110 in which the transmission 118 is active and capable of obtaining power from the engine 112 to propel the wheels 120 of the vehicle 110. In some embodiments, the vehicle 110 may be rear-wheel drive, four-wheel drive, or front-wheel drive. In these and other embodiments, during the driving mode, power may be provided to the equipment 102. Alternately or additionally, power may not be provided to the equipment 102 during the driving mode. Alternately or additionally, power may be provided to some of the equipment 102 during the driving mode and not other of the equipment 102. Alternately or additionally, during the driving mode, power may be directed to the equipment but not driving the equipment 102 due to a clutch or other article that disengages the equipment 102 from obtaining power from the engine 112. In a "non-driving mode," the vehicle 119 may be in a state such that the transmission 118 is not active and no power is provided to the transmission 118 from the engine 112.

In some embodiments, the vehicle 110 may include a cab providing a space for individuals in the vehicle 110 during driving operations and a chassis that may provide a structural frame for the vehicle 110. In some embodiments, the chassis may be configured to support the cab, the engine 112, the power distribution system 114, the drivetrain 116, the transmission 118, the wheels 120, and/or other vehicular components. In some embodiments, the chassis may include frame rails and cross-members between the frame rails. In these and other embodiments, the frame rails and/or the cross-members may provide mounting points for the engine 112, the power distribution system 114, the drivetrain 116, the transmission 118, the wheels 120, and/or other vehicular components. In some embodiments, the equipment 102 may be mounted on the chassis (e.g., on the frame rails and/or cross-members).

In some embodiments, the engine 112 may be mounted to the chassis of the vehicle 110 such that the engine 112 is positioned at or above the chassis. For example, the engine 112 may be mounted above the frame rails of the chassis. Mounting the engine 112 at or above the chassis may allow for a more direct power path to the equipment 102, which may be mounted and/or positioned above the chassis. The engine 112 being more aligned with the equipment 102 may result in fewer vector changes as the power is transferred from the engine 112 to the equipment 102, which may reduce power loss between the engine 112 and the equipment 102. In some embodiments, the engine 112 may be mounted to the chassis such that the engine 112 is positioned at least partially in line with the chassis or below the chassis. For example, the engine 112 may be mounted below the frame rails of the chassis.

In some embodiments, the engine 112 may be any engine capable of generating power to propel the wheels 120 during driving operations and/or operate the equipment 102. For example, the engine 112 may be an internal combustion engine (e.g., a diesel engine, a gas engine, a propane engine, among other combustion engines), a hybrid power system, a fuel-cell system, an electric motor, or any other engine capable of generating power.

In some embodiments, the power distribution system 114 may be coupled between the engine 112 and the transmission 118 and coupled between the engine 112 and the equipment 102. As a result, power may be provided to the equipment 102 from the engine 112 without the power passing through the transmission 118. As such, the power from the engine 112 may bypass the transmission 118 to power the equipment 102. Stated another way, the single engine 112 may provide power to the equipment 102 without providing power to the transmission 118. In this disclosure, power bypassing an element, such as the equipment 102 or the transmission 118, may indicate that the power is not provided to the element.

In some embodiments, because the power distribution system 114 is coupled between the engine 112 and the transmission 118 and coupled between the engine 112 and the equipment 102, the power distribution system 114 may be configured to transfer power to only the transmission 118, to only the equipment 102, and/or to both the transmission 118 and the equipment 102 or a portion of the equipment 102.

In some embodiments, the power distribution system 114 may be configured to selectively transfer power from the engine 112 to the equipment 102, the transmission 118, or both the transmission 118 and the equipment 102, based on an operating mode of the vehicle 110. For example, the power distribution system 114 may transfer power generated by the engine 112 to the transmission 118 only when the vehicle 110 is in driving mode. In these and other embodiments, the power distribution system 114 may bypass the transmission 118, that is not transfer power to the transmission 118, when the vehicle is not in driving mode.

In some embodiments, when the vehicle 110 is in driving mode, the power distribution system 114 may distribute at least a portion of the power generated by the engine 112 to the transmission 118. In some embodiments, the transmission 118 may be coupled to the power distribution system 114, and the transmission 118 may obtain the power from the engine 112 via the power distribution system 114 to propel the wheels 120 of the vehicle 110. For example, the transmission 118 may be configured to obtain power from the engine 112 to propel the wheels 120 of the vehicle 110 during driving operations. In some embodiments, an input end of the transmission 118 may be coupled to an output end of the power distribution system 114. For example, the transmission 118 may be coupled to an output shaft and/or a power takeoff of the power distribution system 114.

In some embodiments, the transmission 118 may be an automatic transmission, a manual transmission, a continuously variable transmission, or any other type of transmission capable of transferring power from the engine 112 to the wheels 120. In some embodiments, the transmission 118 may include various gears, clutches, and/or other components configured to adjust the speed and torque of the power obtained from the engine 112 before transferring the power to the wheels 120. As illustrated in FIG. 1, the transmission 118 may be positioned downstream of the power distribution system 114 such that the power distribution system 114 may transfer power to the transmission 118 only during the driving mode, which may reduce power losses during non-driving operations by bypassing the transmission 118.

In some embodiments, the power distribution system 114 may be configured to selectively transfer power generated by the engine 112 to the equipment 102 when the vehicle is not in driving mode and the vehicle 110 is coupled to the equipment 102. In some embodiments, the power distribution system 114 may be configured to transfer a portion of the power generated by the engine 112 to the equipment 102 when the vehicle 110 is in driving mode or the power distribution system 114 may be configured to bypass the equipment 102 when the vehicle 110 is in driving mode. For example, the power distribution system 114 may be configured to transfer power to the equipment 102 only when the vehicle 110 is not in motion or the power distribution system 114 may be configured to transfer power to the equipment 102 when the vehicle 110 is in motion. Thus, in some embodiments, the equipment 102 may be powered by the engine 112 during driving operations or the equipment 102 may be bypassed during driving operations.

In some embodiments, the power distribution system 114 may distribute at least a portion of the power generated by the engine 112 to the equipment 102 via the drivetrain 116. In some embodiments, the drivetrain 116 may be coupled between the equipment 102 and the power distribution system 114, and the drivetrain 116 may be configured to transfer the power obtained from the power distribution system 114 to the equipment 102.

In these and other embodiments, an input end of the drivetrain 116 may be coupled to an output end of the power distribution system 114, and an output end of the drivetrain 116 may be coupled to an input end of the equipment 102. For example, the drivetrain 116 may be coupled to an output shaft (e.g., a through shaft) and/or a power takeoff of the power distribution system 114, and/or the drivetrain 116 may be coupled to an input shaft of the equipment 102.

In some embodiments, the equipment 102 may be mounted to the vehicle 110, and the drivetrain 116 may be coupled to the equipment 102. In these and other embodiments, the vehicle 110 may transport the equipment 102 from location to location. In these and other embodiments, the equipment 102 may be coupled and/or uncoupled from the drivetrain 116 during driving operations. In some embodiments, the equipment 102 may not be mounted to the vehicle 110. For example, the equipment 102 may be separate from the vehicle 110. In these and other embodiments, the drivetrain 116 may be coupled to the equipment 102 at a location. For example, the equipment 102 may be left at a particular location, and the vehicle 110 may be driven to and from the location without the equipment 102 and may be coupled to the equipment 102 to perform non-driving operations at the location.

In these and other embodiments, the drivetrain 116 may include a series of mechanical components configured to transfer power from the power distribution system 114 to the equipment 102. For example, the drivetrain 116 may include driveshafts, gears, chains, belts, pulleys, universal joints, and/or other components that may be used in transferring the power received from the power distribution system 114 to the equipment 102.

Thus, when the vehicle 110 is in the non-driving mode, the engine 112 may generate power, the power distribution system 114 may bypass the transmission 118, and the power distribution system 114 may transfer the power to the drivetrain 116, which may cause the equipment 102 to be operated. Because the transmission 118 is not activated during the operation of the equipment 102, less fuel may be consumed, the transmission 118 may not cause any power losses, and/or the equipment 102 may be operated regardless of whether the transmission 118 is functioning or needs maintenance.

In some embodiments, the power distribution system 114 may include various components configured to transfer power from the engine 112 to the drivetrain 116, the transmission 118, other components of the vehicle 110, and/or to the equipment 102. For example, in some embodiments, the power distribution system 114 may include a gearbox (e.g., such as the gearboxes described in more detail with respect to FIGS. 3-5 and 6A-6D), a clutch (e.g., such as the clutches described in more detail with respect to FIGS. 3-5 and 6A-6D), a power takeoff, a drive shaft, a hydraulic system, an electrical system, and/or other components configured to distribute power throughout the vehicle 110 and/or to the equipment 102.

For example, as described in more detail with respect to FIGS. 3-5, and 6A-6D, the power distribution system 114 may include a gearbox configured to transfer at least a portion of the power generated by the engine 112 to the transmission 118 only during the driving mode, and the gearbox may be configured to bypass the transmission 118 during the non-driving mode. Thus, the equipment 102 may be operated with reduced power losses and/or reduced fuel consumption due to bypassing the transmission 118.

Modifications, additions, or omissions may be made to the environment 100 without departing from the scope of the present disclosure. For example, one skilled in the art would appreciate that the vehicle 110 may include vehicular components other than those expressly illustrated in the FIG. 1. For example, the vehicle 110 may include one or more clutches, a gearbox, power takeoffs, and/or other vehicular components. Some examples of the components may be described with respect to FIGS. 3 and 4. In some embodiments, the vehicle 110 may include an additional engine to power at least some of the equipment 102. In these and other embodiments, the engine 112 may be configured to drive the other equipment 102 and the transmission 118. As another example, the vehicle 110 may include multiple drivetrains 116. FIG. 4 describes an example of multiple drivetrains 116.

Figure 2:
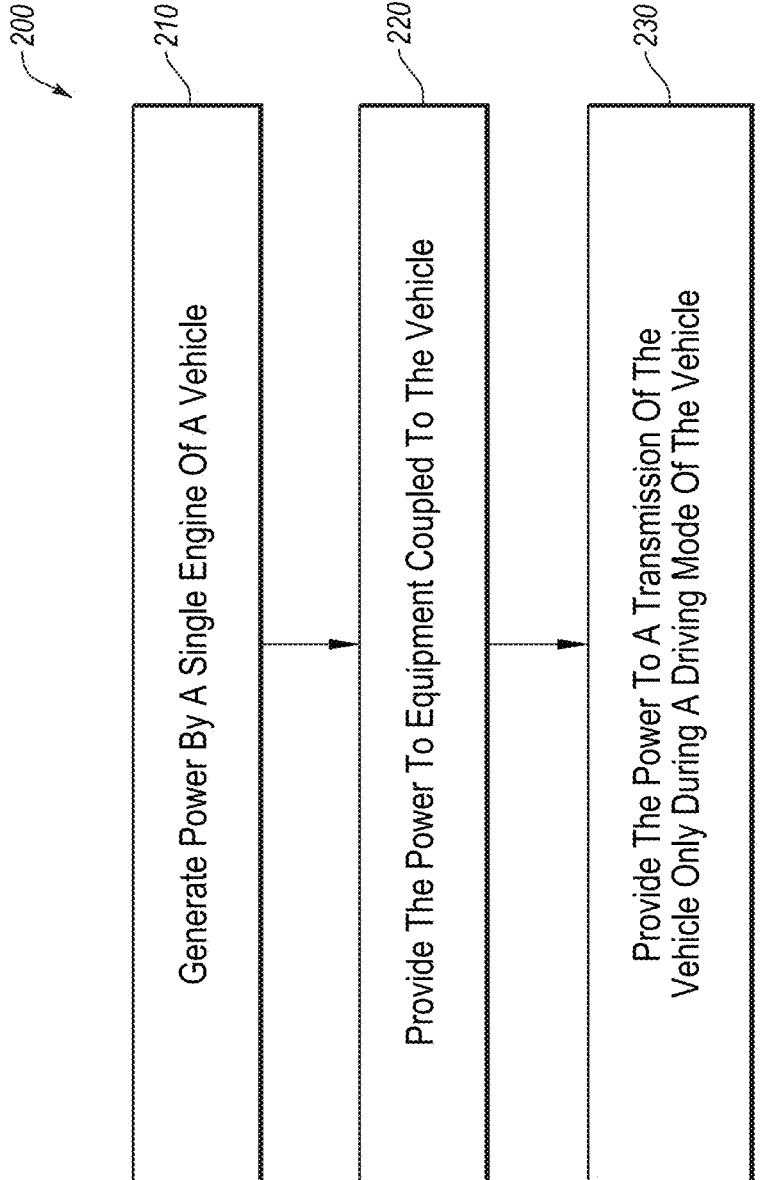
FIG. 2 illustrates a flowchart of an example method of operating a vehicle.

FIG. 2 illustrates a flowchart of an example method 200 of operating a vehicle, in accordance with one or more embodiments of the present disclosure. The method 200 may be performed by any suitable system, apparatus, or device. For example, the method 200 may be implemented with any of the vehicles described throughout the present disclosure. For instance, the method 200 may be implemented by the vehicle 110. Although illustrated with discrete blocks, the steps and operations associated with one or more blocks of the method 200 may be divided into additional blocks, combined into fewer blocks, or eliminated, depending on the particular implementation.

The method 200 of operating a vehicle may include blocks 210, 220, and 230. At block 210, power may be generated by a single engine of a vehicle.

At block 220, the power may be provided to equipment coupled to the vehicle. In some embodiments, the power may be provided to the equipment via a power distribution system coupled between the engine and the transmission and coupled between the engine and the equipment.

In some embodiments, the power may be transferred from the power distribution system to a drivetrain coupled to the power distribution system. In these and other embodiments, the equipment may be coupled to the drivetrain and the power may be transferred from the drivetrain to the equipment.

At block 230, the power may be provided to a transmission of the vehicle only during a driving mode of the vehicle. In some embodiments, the power distribution system may bypass the transmission when the vehicle is not in the driving mode such that the power generated by the engine is not provided to the transmission when the vehicle is not in the driving mode. For example, during a non-driving mode, power from the engine may only be directed to the equipment and not to the transmission.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

In some embodiments, the engine and the equipment may be disengaged via a first clutch, and the first clutch may be configured to selectively couple the equipment and the engine. In some embodiments, the vehicle described with respect to FIG. 2 may include any of the aspects, features, and/or components described with respect to any of the other vehicles in the present disclosure.

Figure 3:
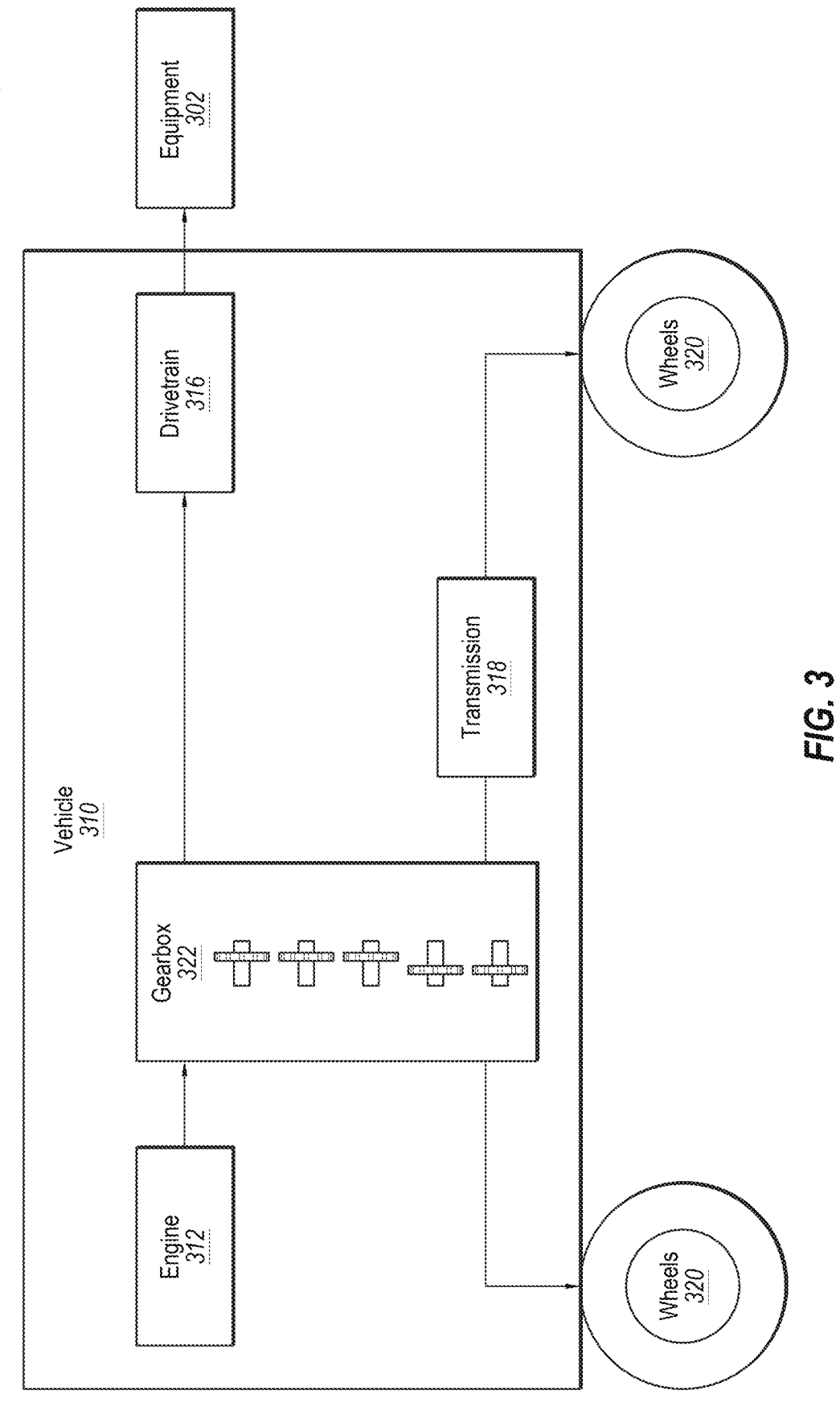
FIG. 3 illustrates a block diagram of an environment for multi-functional vehicle operation.
Figure 4:
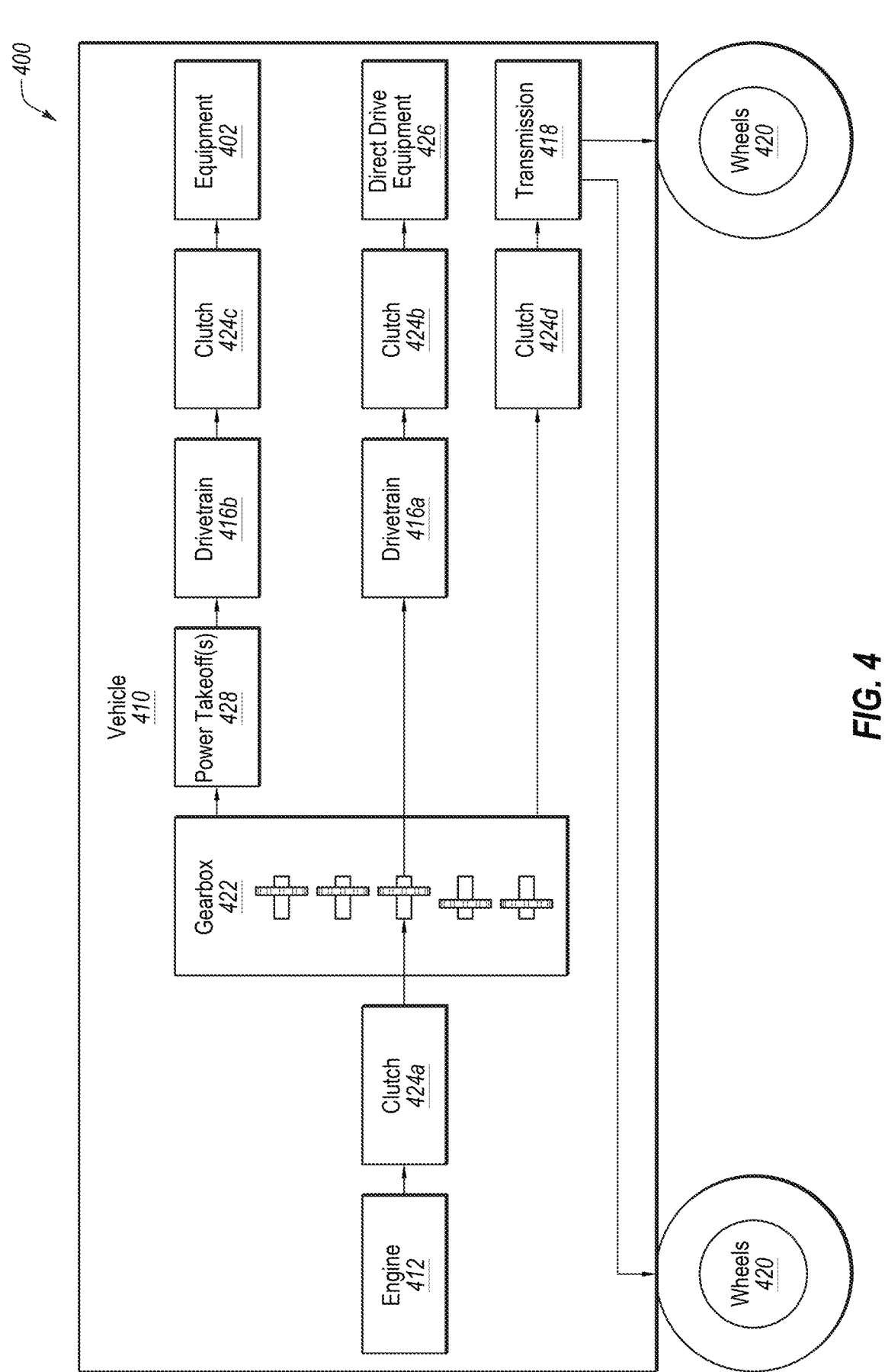
FIG. 4 illustrates a block diagram of another environment for multi-functional vehicle operation.

FIG. 3 illustrates a block diagram of an environment 300 for multi-functional vehicle operation. The environment 300 may include a multi-functional vehicle 310 ("the vehicle 310") and equipment 302. The vehicle 310 may be selectively coupled to the equipment 302. The vehicle may include an engine 312, a gearbox 322, a drivetrain 316, a transmission 318, and wheels 320. The equipment 302, the engine 312, the gearbox 322 the drivetrain 316, the transmission 318, and/or the wheels 320 may be similar to similarly named components described throughout this disclosure. For example, the equipment 302 may be similar to the equipment 102, the engine 312 may be similar to the engine 112, the drivetrain 316 may be similar to the drivetrain 116, the transmission 318 may be similar to the transmission 118, and/or the wheels 320 may be similar to the wheels 120. As another example, the gearbox 322 may be similar to the gearbox 622 described with respect to FIGS. 6A-6D.

In some embodiments, the gearbox 322 may be or be a part of the power distribution system 114 described with respect to FIG. 1. In some embodiments, the gearbox 322 may be coupled between the engine 312 and the transmission 318 and coupled between the engine 312 and the equipment 302. As a result, power may be provided to the equipment 302 from the engine 312 without the power passing through the transmission 318. As such, the power from the engine 312 may bypass the transmission 318 to power the equipment 302. An example of the gearbox 322 is described in more detail with reference to FIGS. 6A-6D.

In some embodiments, because the gearbox 322 is coupled between the engine 312 and the transmission 318 and coupled between the engine 312 and the equipment 302, the gearbox 322 may be configured to transfer power to only the transmission 318, to only the equipment 302, and/or to both the transmission 318 and the equipment 302 or a portion of the equipment 302.

In some embodiments, the gearbox 322 may be configured to selectively transfer power from the engine 312 to the equipment 302, the transmission 318, or both the transmission 318 and the equipment 302, based on an operating mode of the vehicle 310. For example, the gearbox 322 may transfer power generated by the engine 312 to the transmission 318 only when the vehicle 310 is in driving mode. In these and other embodiments, the gearbox 322 may bypass the transmission 118, that is not transfer power to the transmission 318, when the vehicle is not in driving mode.

In some embodiments, the gearbox 322 may include multiple gears configured to be selectively activated depending on whether power is to be distributed to all or a portion of the equipment 302 and/or to the transmission 318. In some embodiments, the gearbox 322 may include a first set of gears that may be activated when power is distributed to the transmission 318 and a second set of gears that may be activated when power is distributed to all or a portion of the equipment 302. For example, as illustrated in FIG. 3, the second set of gears may include the top two gears in the gearbox 322 and the middle gear, which may be activated during a non-driving mode, and the first set of gears may include the bottom two gears in the gearbox 322 and the middle gear, which may be activated during a driving mode of the vehicle 310. Thus, the gearbox 322 may distribute the power differently in the environment 300 depending on the mode of operation by activating different gears.

In some embodiments, when the vehicle 310 is in driving mode, the gearbox 322 may distribute at least a portion of the power generated by the engine 312 to the transmission 318. In these and other embodiments, the first set of gears may be activated only during the driving mode of the vehicle 310.

In some embodiments, when the vehicle 310 is not in driving mode, the gearbox 322 may distribute the power generated by the engine 312 to the equipment 302 and bypass the transmission 318. In these and other embodiments, the second set of gears may be activated to distribute power to the equipment 302 and the first set of gears may not be activated such that no power is provided to the transmission 318.

For example, when the vehicle 310 is in a non-driving mode the top two gears and the middle gear may be activated (as illustrated in FIG. 3) causing power to be transferred to the equipment 302 via the drivetrain 316. In this example, the bottom two gears may not be activated when the vehicle 310 is in the non-driving mode causing no power to be provided to the transmission 318. As another example, when the vehicle 310 is in driving mode, the bottom two gears may be activated by the middle gear (e.g., by shifting the middle gear) or by a different middle gear such that power may be transferred to the transmission 318.

Modifications, additions, or omissions may be made to the environment 300 without departing from the scope of the present disclosure. For example, one skilled in the art would appreciate that the vehicle 310 may include vehicular components other than those expressly illustrated in the FIG. 3. For example, the vehicle 310 may include one or more clutches, a gearbox, power takeoffs, and/or other vehicular components. Some examples of the components may be described with respect to FIG. 4. In some embodiments, the vehicle 310 may include an additional engine to power at least some of the equipment 302. In these and other embodiments, the engine 312 may be configured to drive the other equipment 302 and the transmission 318. As another example, the vehicle 310 may include multiple drivetrains 316. FIG. 4 describes an example of multiple drivetrains 316.

FIG. 4 illustrates a block diagram of an environment 400 for multi-functional vehicle operation. The environment 400 may include a multi-functional vehicle 410 ("the vehicle 410"). The vehicle 410 may include equipment 402, the engine 412, one or more drivetrains 416, the transmission 418, the wheels 420, and the gearbox 422, all of which may be similar to similarly named components described throughout this disclosure. The vehicle 410 may further include one or more clutches 424, direct drive equipment 426, and/or one or more power takeoffs 428. In some embodiments, the direct drive equipment 426 may be any type of the equipment throughout this disclosure that is directly coupled to the engine without gearing as described with respect to FIG. 4. For example, the direct drive equipment 426 may include subterranean equipment, rig equipment, and/or heavy machinery equipment.

As illustrated in FIG. 4, in some embodiments, the vehicle 410 may include the equipment 402 and the direct drive equipment 426. In some embodiments, the equipment 402 and/or the direct drive equipment 426 may be mounted on the vehicle 410. For example, the equipment 402 and/or the direct drive equipment 426 may be mounted on the vehicle 410 such that the equipment 402 and/or the direct drive equipment 426 may be more aligned with the engine 412 than the transmission 418. For example, the power output of the engine 412 may be more vertically aligned with the power input of the direct drive equipment 426 and/or the power input of the equipment 402 than the power input of the transmission 418. As a result, there may be less vector changes in the power distribution to the direct drive equipment 426 and/or equipment 402 than in the power distribution to the transmission 418. In some embodiments, the engine 412, the equipment 402, and/or the direct drive equipment 426 may be mounted at or above the chassis such that there are less vector changes when the power is distributed from the engine 412 to the equipment 402 than there are when the power is distributed from the engine 412 to the transmission 418.

In some embodiments, power generated by the engine 412 may be transferred to the direct drive equipment 426 directly without the use of gearing. For example, the direct drive equipment 426 may be coupled to the gearbox 422 via a through shaft (not expressly illustrated) such that power generated by the engine 412 may be transferred to the direct drive equipment 426 via the through shaft, and not via the gearing included in the gearbox 422. In some embodiments, the direct drive equipment 426 may be similar to the equipment 402.

In some embodiments, the direct drive equipment 426 may be configured to obtain power from the engine 412 regardless of whether the vehicle 410 is in driving mode or non-driving mode. In some embodiments, the gearbox 422 may selectively transfer power to the direct drive equipment 426 such that the direct drive equipment 426 only obtains power when the vehicle 410 is not in driving mode.

In some embodiments, the direct drive equipment 426 may be selected based on the equipment that may use the most power during non-driving operations. For example, in drilling operations, an air compressor may consume more power than other equipment used in drilling operations. As a result, the air compressor may be used as the direct drive equipment 426 to improve the power efficiency of the vehicle 410 during drilling operations. The power efficiency of the vehicle 410 may be improved because the power may not be transferred between gears. In these and other embodiments, the direct drive equipment 426 may be more aligned with the engine 412 than the equipment 402 and/or the transmission 418. For example, the power output of the engine 412 may be more vertically aligned, with respect to the ground on which the vehicle 410 is located, with the power input to the direct drive equipment 426 than the power inputs to the equipment 402 and/or transmission 418. As a result, there may be less vector changes in the power distribution to the direct drive equipment 426 than to the equipment 402 and/or transmission 418.

In some embodiments, the vehicle may include power takeoffs 428. In some embodiments, the power takeoffs 428 may be power outputs that may be configured to distribute at least a portion of the power generated by the engine 412 to components coupled to the power takeoffs 428. For example, a first power takeoff may be coupled to first equipment, a second power takeoff may be coupled to second equipment, and/or a third power takeoff may be coupled to the transmission 418. In some embodiments, a first power takeoff may be coupled to a first portion of the equipment 402, and a second power takeoff may be coupled to a second portion of the equipment 402. For example, a first power takeoff may be coupled to a first pump and a second power takeoff may be coupled to a second pump. In some embodiments, the gearbox 422 may be coupled to the power takeoffs 428 as illustrated in FIG. 4, or the gearbox 422 may include the power takeoffs 428.

In these and other embodiments, the power takeoffs 428 may include male power takeoffs (e.g., output shafts, male gear adaptors) and/or female power takeoffs (e.g., output receptacles, female gear adaptors). For example, the power takeoffs 428 may include externally splined output shafts configured to engage internally splined receptacles and/or may include internally splined output receptacles configured to engage externally splined input shafts.

In some embodiments, the vehicle 410 may include multiple power takeoffs. For example, the vehicle 410 may include one, two, three, four, five, six, seven, eight, or more power takeoffs. In some embodiments, at least one of the power takeoffs 428 may be configured to operate in non-driving mode and/or at least one of the power takeoffs 428 may be configured to operate in driving mode.

In some embodiments, the vehicle 410 may include multiple drivetrains 416. For example, as illustrated in FIG. 4, the vehicle 410 may include a first drivetrain 416a and a second drivetrain 416b. In these and other embodiments, the first drivetrain 416a may couple the gearbox 422 to first equipment and the second drivetrain 416b may couple the gearbox 422 to second equipment. In some embodiments, the first equipment and the second equipment may be the same or the first equipment and the second equipment may be different. For example, the first drivetrain 416a may couple the gearbox 422 to the direct drive equipment 426, and the second drivetrain 416b may couple the gearbox 422 to the equipment 402. For instance, a first input end of the first drivetrain 416a may be coupled to the gearbox 422 via a through shaft included in the gearbox 422, a first output end of the first drivetrain 416a may be coupled to an input end of the direct drive equipment 426, a second input end of the second drivetrain 416b may be coupled to the gearbox 422 via the power takeoff 428, and a second output end of the second drivetrain 416b may be coupled to the equipment 402. Thus, the first drivetrain 416a may transfer at least a portion of the power generated by the engine 412 to the direct drive equipment 426, and the power takeoff 428 may transfer a portion of the power generated by the engine 412 to the equipment 402 via the second drivetrain 416b.

In some embodiments, the vehicle 410 may include one or more clutches 424 that may be configured to selectively couple the engine 412 and various components of the vehicle 410. In these and other embodiments, the clutches may include any device or system capable of selectively transmitting rotational force or torque between the engine 412 and one or more other components of the vehicle 410, such as via friction, hydraulic pressure, electromagnetic actuation, or mechanical interlock. For example, the clutches 424 may selectively engage and disengage a drive connection between the engine 412 and one or more other components of the vehicle 410. For example, the clutches 424 may enable torque transmission when engaged and may allow relative rotation or disconnection when disengaged.

In these and other embodiments, the one or more clutches 424 may include a friction clutch, a dog clutch, a hydraulic clutch, a pneumatic clutch, a multiple-plate clutch, a spring-loaded clutch, a wet clutch, a dry clutch, a centrifugal clutch, and/or an electromagnetic clutch, among other clutches. In these and other embodiments, the one or more clutches 424 may be operable in driving mode and/or in non-driving mode. In some embodiments, some of the clutches 424 may be operable in driving mode, some of the clutches 424 may be operable in non-driving mode, and/or some of the clutches may be operable in driving mode and non-driving mode.

In some embodiments the vehicle 410 may include a first clutch 424a positioned between the engine 412 and the gearbox 422. In some embodiments, the first clutch 424a may selectively couple the engine 412 and the gearbox 422 such that power may be transferred to the gearbox 422 when the first clutch 424a is engaged and power may not be transferred to the gearbox 422 when the first clutch is disengaged.

In some embodiments, the vehicle 410 may include a second clutch 424b positioned between the gearbox 422 and the direct drive equipment 426. In some embodiments, the second clutch 424b may selectively couple the engine 412 and the direct drive equipment 426 such that power may be transferred to the direct drive equipment 426 when the second clutch 424b is engaged and power may not be transferred to the direct drive equipment 426 when the second clutch 424b is disengaged.

As illustrated in FIG. 4, the second clutch 424b may be positioned between the first drivetrain 416a and the direct drive equipment 426. For example, the second clutch 424b may be coupled to the input end of the direct drive equipment 426 and/or the output end of the first drivetrain 416a. In some embodiments, the second clutch 424b may be positioned between the gearbox 422 and the first drivetrain 416a. For example, the second clutch 424b may be coupled to an output end of the gearbox 422 (e.g., the through shaft) and/or the input end of the first drivetrain 416a.

In some embodiments, the vehicle 410 may include a third clutch 424c positioned between the gearbox 422 and the equipment 402. In some embodiments, the third clutch 424c may selectively couple the engine 412 and the equipment 402 such that power may be transferred to the equipment 402 when the third clutch 424c is engaged and power may not be transferred to the equipment 402 when the third clutch 424c is disengaged.

As illustrated in FIG. 4, the third clutch 424c may be positioned between the second drivetrain 416b and the equipment 402. For example, the third clutch 424c may be coupled to the input end of the equipment 402 and/or the output end of the second drivetrain 416b. In some embodiments, the third clutch 424c may be positioned between the gearbox 422 and the second drivetrain 416b. For example, the third clutch 424c may be coupled to a power takeoff 428 and/or the input end of the second drivetrain 416b.

In some embodiments, the vehicle 410 may include a fourth clutch 424d positioned between the gearbox 422 and the transmission 418. In some embodiments, the fourth clutch 424d may selectively couple the engine 412 and the transmission 418 such that power may be transferred to the transmission 418 when the fourth clutch 424d is engaged and power may not be transferred to the transmission 418 when the fourth clutch 424d is disengaged.

Thus, the first clutch 424a may allow the engine 412 to be disengaged from the gearbox 422, the equipment 402, the direct drive equipment 426, and the transmission 418. The second clutch 424b may allow the engine 412 to be disengaged from the first drivetrain 416a and/or the direct drive equipment 426. The third clutch 424c may allow the engine 412 to be disengaged from the second drivetrain 416b and/or the equipment 402. The fourth clutch may allow the engine 412 to be disengaged from the transmission 418.

In an example operation of the vehicle 410, the engine 412 may generate power, which may be transferred to the gearbox 422 when the first clutch 424a is engaged. In some embodiments, when the vehicle is in driving mode, the gearbox 422 may transfer at least a portion of the power to the transmission 418 when the fourth clutch 424d is engaged. In some embodiments, when the vehicle is in driving mode, the gearbox 422 may transfer at least a portion of the power to the direct drive equipment 426 when the second clutch 424b is engaged, and/or may transfer at least a portion of the power to the equipment 402 when the third clutch 424c is engaged. In some embodiments, the second clutch 424b may be disengaged during driving operations such that the direct drive equipment 426 is bypassed during driving mode. In these and other embodiments, the gearbox 422 may bypass the equipment 402, and/or the third clutch 424c may be disengaged during driving mode such that the equipment 402 is bypassed during driving operations.

In some embodiments, when the vehicle 410 is not in driving mode, the gearbox 422 may bypass the transmission 418 and/or the fourth clutch 424d may be disengaged such that power is not transferred from the gearbox 422 to the transmission 418. In these and other embodiments, the gearbox 422 may transfer at least a portion of the power generated by the engine 412 to the equipment 402 and/or the direct drive equipment 426. In these and other embodiments, the second clutch 424b and/or the third clutch 424c may be selectively engaged and disengaged such that power may be transferred to only the equipment 402 and/or the direct drive equipment 426 that may be used during the non-driving operations. For example, the direct drive equipment 426 may be an air compressor, and the second clutch 424b may be disengaged in non-driving operations where compressed air may not be needed.

Modifications, additions, or omissions may be made to the environment 400 without departing from the scope of the present disclosure. For example, one skilled in the art would appreciate that the vehicle 410 may include vehicular components other than those expressly illustrated in the FIG. 4. For example, the vehicle 410 may include an additional engine to power at least some of the equipment 402. In these and other embodiments, the engine 412 may be configured to drive the other equipment 402, the direct drive equipment 426, and the transmission 418.

In some embodiments, the direct drive equipment 426 may be omitted. In some embodiments, the equipment 402 may be omitted. In some embodiments, the equipment 402 may be directly coupled to the power takeoff 428, and/or the direct drive equipment 426 may be directly coupled to the gearbox 422 via the through shaft.

In these and other embodiments, the first drivetrain 416a and/or the second drivetrain 416b may be omitted. In some embodiments, the first drivetrain 416a and/or the second drivetrain 416b may be positioned differently than illustrated in FIG. 4 and/or the vehicle 410 may include one or more additional drivetrains. For example, a third drivetrain may be positioned between the engine 412 and the gearbox 422 and/or a fourth drivetrain may be positioned between the transmission 418 and the wheels 420.

In these and other embodiments, the first clutch 424a, the second clutch 424b, the third clutch 424c, and/or the fourth clutch 424d may be omitted. In some embodiments, the clutches 424 may be positioned differently than illustrated in FIG. 4.

Figure 5:
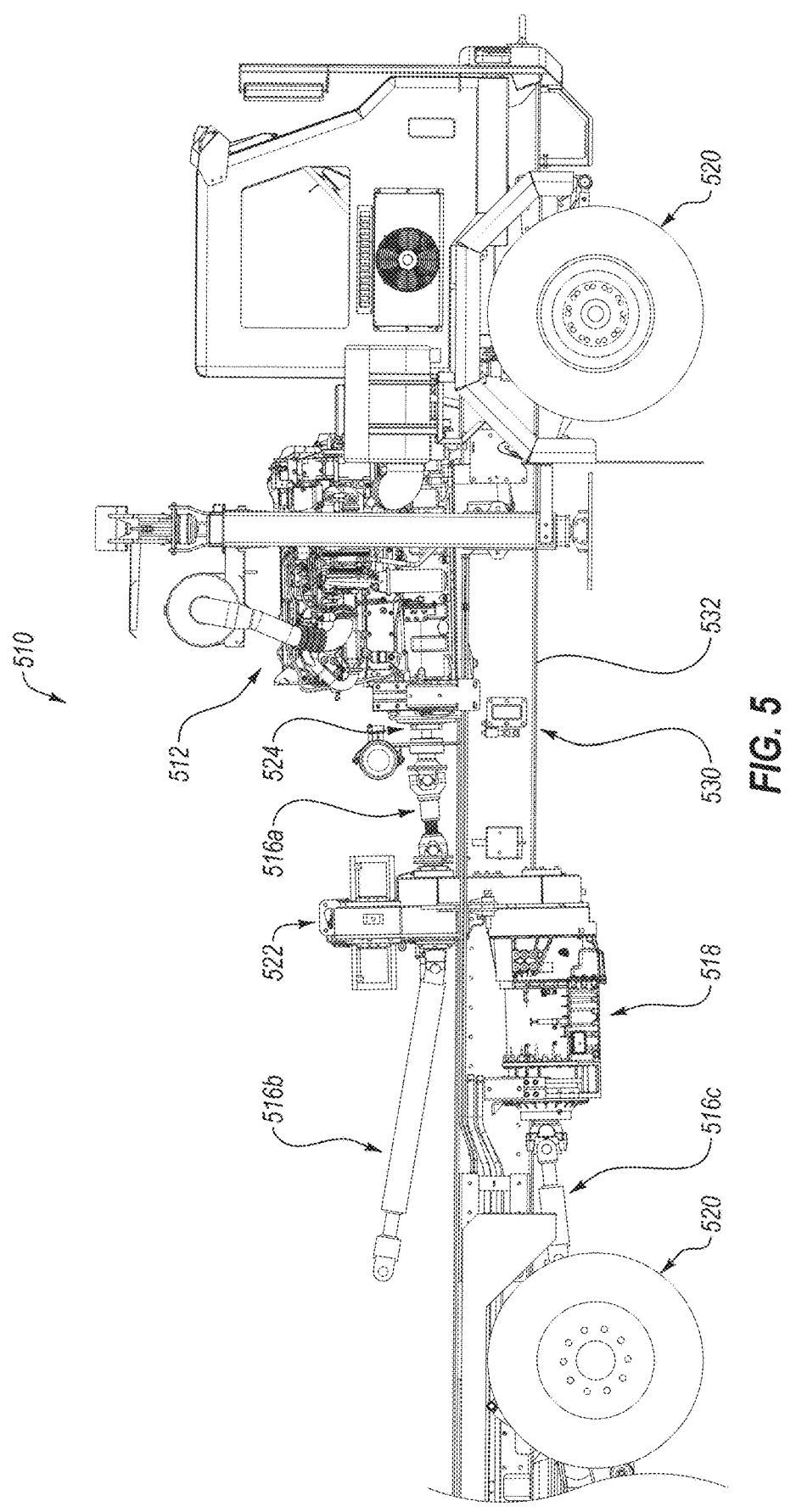
FIG. 5 illustrates a multi-functional vehicle configured to power equipment.

FIG. 5 illustrates a multi-functional vehicle 510 ("the vehicle 510") configured to power equipment. The vehicle 510 may include an engine 512, a clutch 524, a first drivetrain 516a, a second drivetrain 516b, a third drivetrain 516c, a transmission 518, wheels 520, a gearbox 522, and a clutch 524, which may be similar to similarly named components described throughout this disclosure. The vehicle may further include a chassis 530 having one or more frame rails 532. For example, the second drivetrain 516b may be configured to be coupled to equipment (e.g., subterranean equipment, rig equipment, and/or heavy machinery equipment, among other equipment).

As illustrated in FIG. 5, the engine 512 may be coupled to the gearbox 522 via a first drivetrain 516a. In some embodiments, an input end of the first drivetrain 516a may be coupled to an output end of the engine 512 and an output end of the first drivetrain 516a may be coupled to the gearbox 522. For example, an input U-joint may be coupled to an output shaft of the engine 512 and an output U-joint may be coupled to an input end of a through shaft of the gearbox 522.

In some embodiments, the engine 512 may be selectively coupled to the gearbox 522 via the clutch 524. In these and other embodiments, the clutch 524 may allow the engine 512 to be engaged and disengaged with the first drivetrain 516a, the gearbox 522, the second drivetrain 516b, the transmission 518, and/or the third drivetrain 516c.

In some embodiments, the gearbox 522 may be coupled to the second drivetrain 516b and/or the transmission 518. For example, an input end of the transmission 518 may be coupled to a first output end of the gearbox 522, and an input end of the second drivetrain 516b may be coupled to a second output end of the gearbox 522. In some embodiments, the output ends of the gearbox 522 may include one or more power takeoffs and/or a through shaft.

In these and other embodiments, an output end of the second drivetrain 516b may be configured to be coupled to equipment. For example, the second drivetrain 516b may be configured to be coupled to subterranean equipment, rig equipment, and/or heavy machinery.

In some embodiments, the third drivetrain 516c may be coupled to the wheels 520 and the transmission 518. For example, an input end of the third drivetrain 516c may be coupled to an output end of the transmission 518, and an output end of the third drivetrain 516c may be coupled to at least some of the wheels 520.

In some embodiments, the gearbox 522 may selectively transfer power to the transmission 518 and/or to the second drivetrain 516b. For example, the gearbox 522 may bypass the transmission 518 and/or the second drivetrain 516b depending on the operation performed by the vehicle 510 such that power may not be provided to the transmission 518 and/or the second drivetrain 516b during some operations, such as during a non-driving mode, and may be provided to the transmission 518 and/or the second drivetrain 516b in other operations, such as during a driving mode. For instance, the gearbox 522 may only provide power to the transmission 518 during driving operations and may only provide power to the second drivetrain 516b during non-driving operations.

In some embodiments, during driving operations, the transmission 518 may transfer the power from the engine 512 to the third drivetrain 516c causing the wheels 520 to be propelled. As illustrated in FIG. 5, the vehicle 510 is configured as a rear-wheel drive vehicle, and in this configuration, the third drivetrain 516 may cause the rear wheels 520 to rotate, which in turn cause the front wheels to rotate as the vehicle 510 is propelled. It will be appreciated that the vehicle 510 may be configured in other manners without departing from the scope of the present disclosure (e.g., front-wheel drive, four-wheel drive, all-wheel drive).

In some embodiments, the gearbox 522 may be configured to bypass the second drivetrain 516b during the driving mode. For example, the gearbox 522 may not provide power to the second drivetrain 516b during the driving mode. In these and other embodiments, power may not be transferred to the equipment (not illustrated) coupled to the second drivetrain 516b during the driving mode.

In some embodiments, the gearbox 522 may be configured to transfer a first portion of the power generated by the engine 512 to the second drivetrain 516b during the driving mode and a second portion of the power generated by the engine 512 to the transmission 518 during the driving mode. Thus, the second drivetrain 516b may be operated during the driving mode, which may also allow equipment coupled to the second drivetrain 516b to be operated during the driving mode.

As illustrated in FIG. 5, in some embodiments, the engine 512 may be positioned above the one or more frame rails 532 of the chassis 530 such that the engine 512 may be better aligned with the equipment that may be operated by the vehicle 510. For example, as illustrated in FIG. 5, the output end of the second drivetrain 516b may also be positioned above the one or more frame rails 532 of the chassis 530. As a result, there may be less vector changes in the power distribution to the equipment coupled to the output end of the second drivetrain 516b during non-driving operations.

Modifications, additions, or omissions may be made to the vehicle 510 without departing from the scope of the present disclosure. For example, one skilled in the art would appreciate that the vehicle 510 may include vehicular components other than those expressly illustrated in the FIG. 5. For example, the vehicle 510 may include an additional engine, additional drivetrains, and/or additional clutches. In some embodiments, the gearbox 522 may include power takeoffs (not expressly illustrated), which may be coupled to equipment. In some embodiments, the second drivetrain 516b may be omitted and equipment may be directly coupled to the gearbox 522.

Figure 6A:
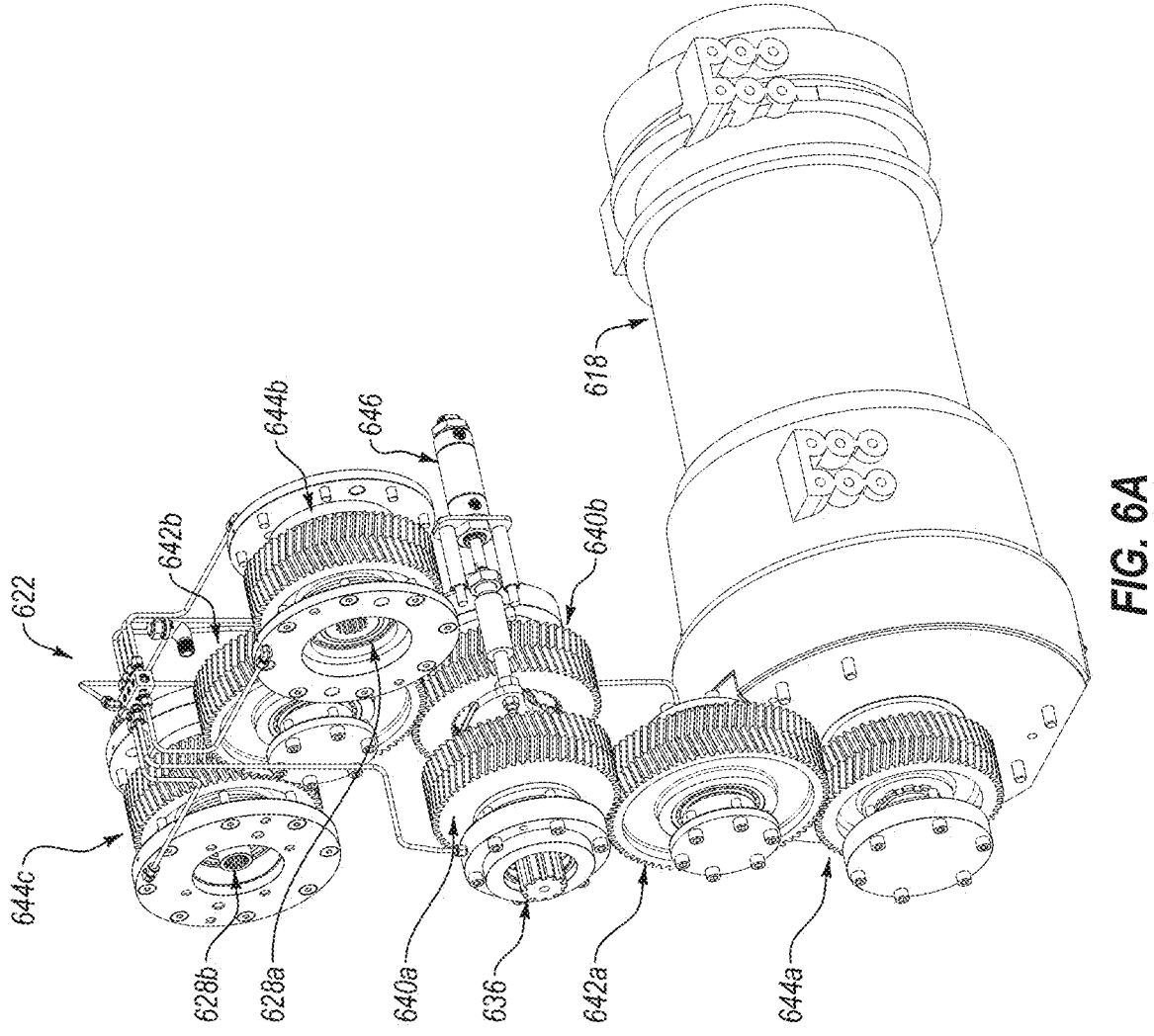
FIGS. 6A and 6B illustrate perspective views of an example gearbox coupled to a transmission.
Figure 6B:
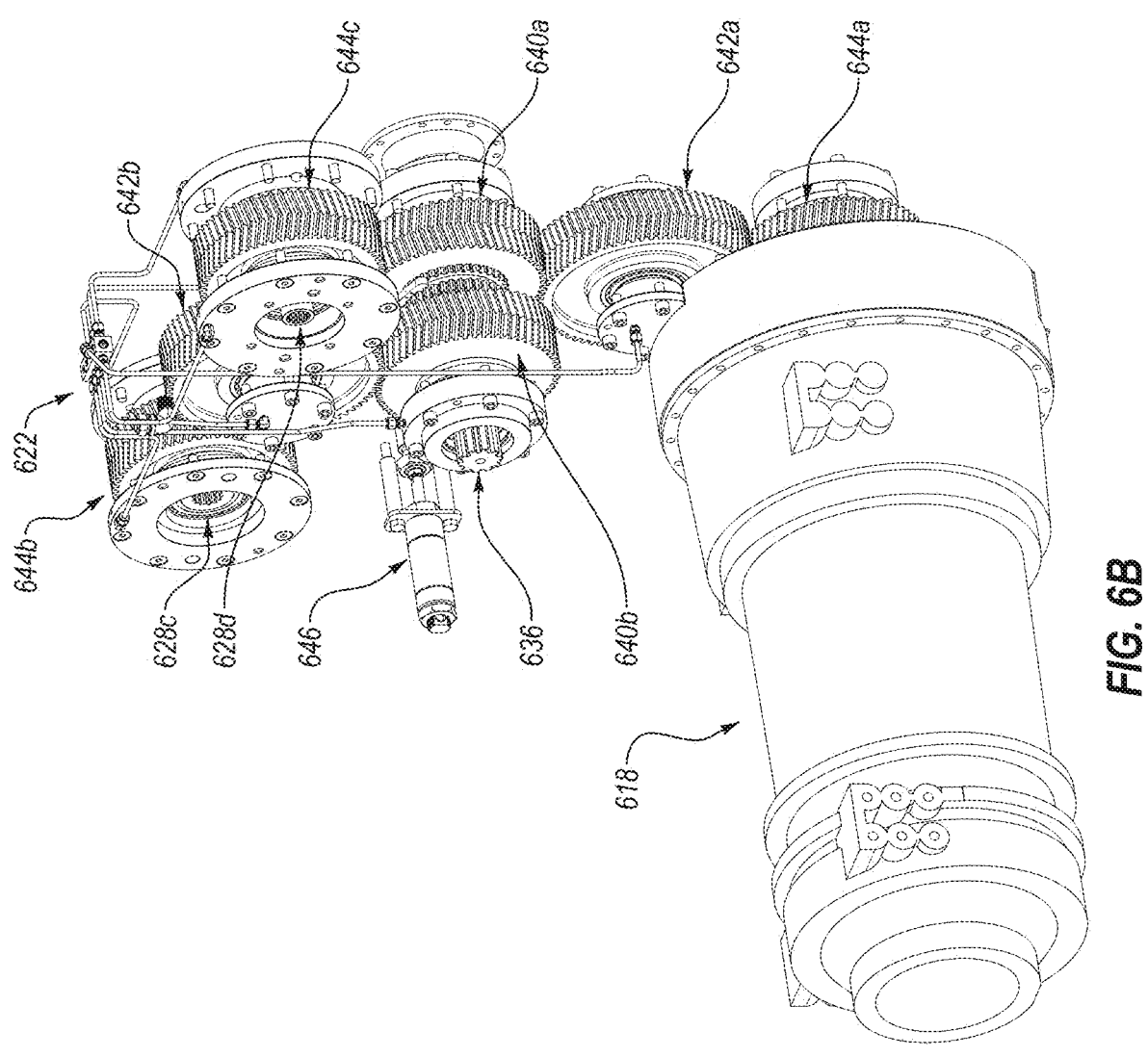
Figure 6C:
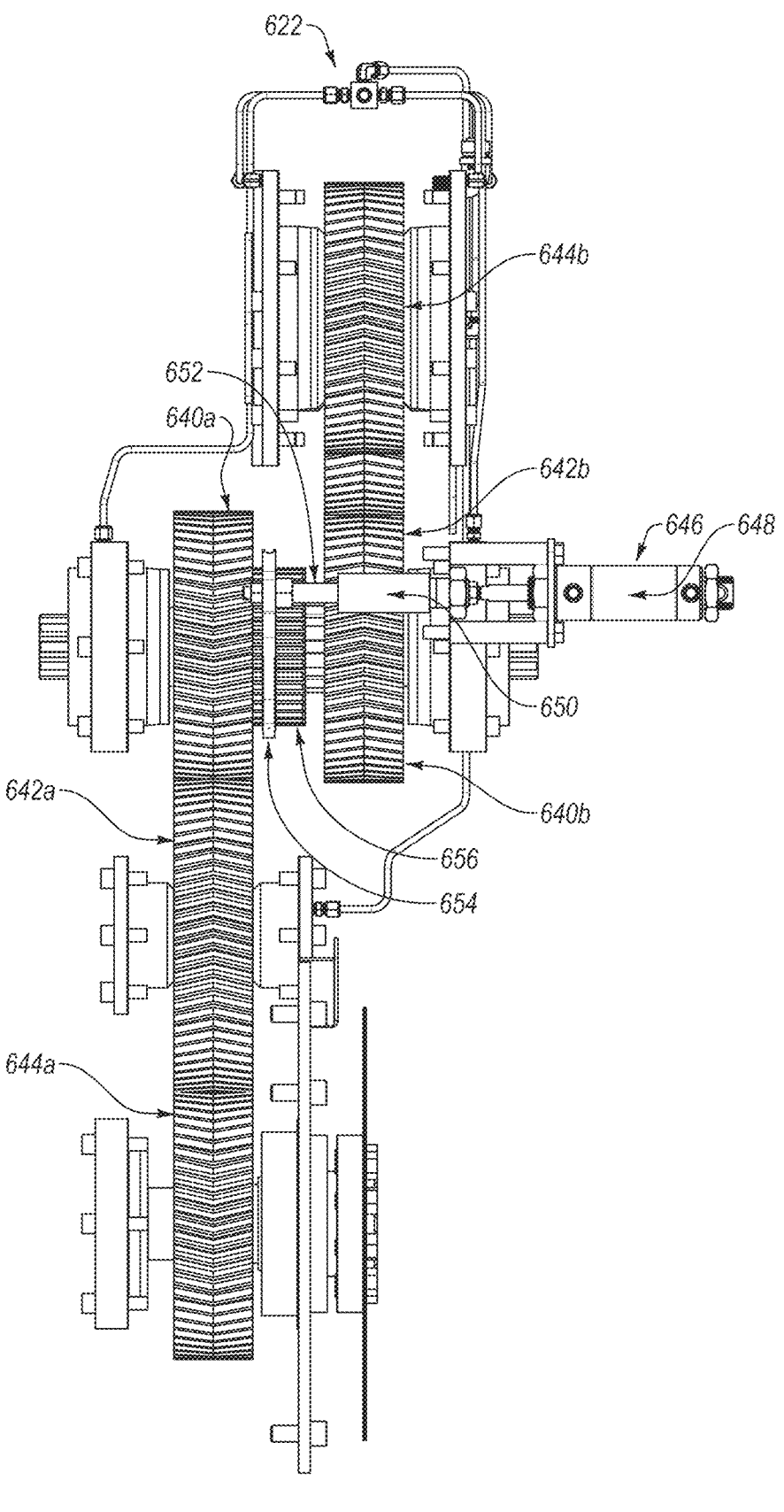
FIG. 6C illustrates a side view of the example gearbox of FIGS. 6A and 6B.
Figure 6D:
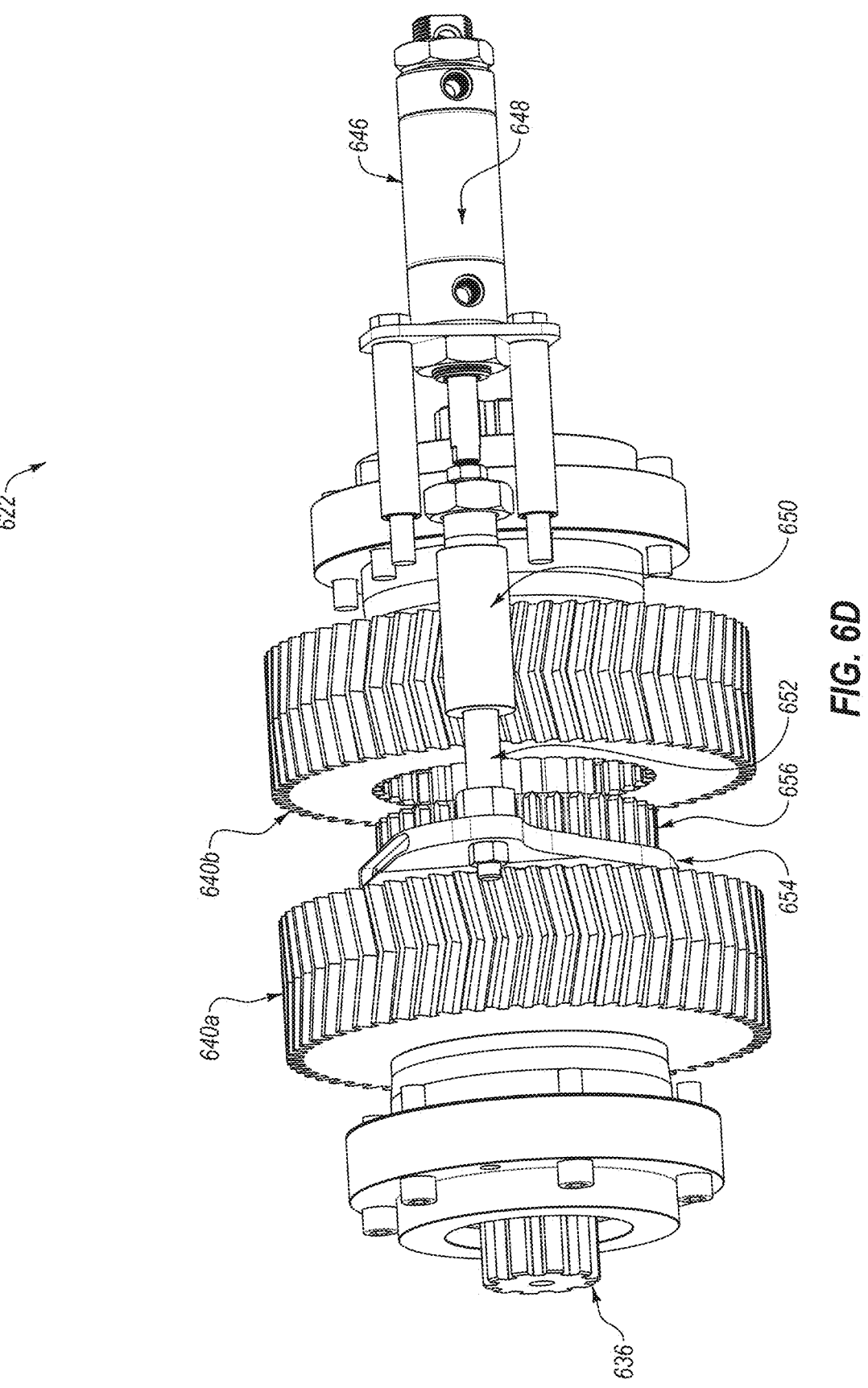
FIG. 6D illustrates a partial view of the example gearbox of FIGS. 6A and 6B.

FIGS. 6A and 6B illustrate perspective views of an example gearbox 622 coupled to a transmission 618. FIG. 6C illustrates a side view of the example gearbox 622 of FIGS. 6A and 6B, and FIG. 6D illustrates a partial view of the example gearbox 622 of FIGS. 6A and 6B. The gearbox 622 and the transmission 618 may be similar to similarly named components described throughout this disclosure. As illustrated in FIGS. 6A and 6B, the gearbox 622 may include a through shaft 636, one or more power takeoffs 628, one or more drive gears 640, one or more idler gears 642, one or more driven gears 644, and a shifter assembly 646, all of which may be similar to similarly named components described throughout this disclosure.

In some embodiments, the through shaft 636 may be coupled to an engine and may obtain power from the engine. In some embodiments, the through shaft 636 may be directly coupled to an engine (e.g., an output end of the engine) or the through shaft 636 may be coupled to the engine via a different component such as a drivetrain and/or a clutch. In some embodiments, an output end of the through shaft 636 may be configured to be coupled to equipment. For example, the output end of the through shaft 636 may be configured to be coupled to the direct drive equipment 426 described with respect to FIG. 4. In some embodiments, the through shaft 636 may be sized and configured to interact with the drive gears 640. In some embodiments, the through shaft 636 may be configured to interact with different drive gears 640 for different operations. For example, the through shaft 636 may interact with the first drive gear 640*a* only during driving operations and may interact with a second drive gear 640*b* during non-driving operations.

In some embodiments, the gearbox 622 may include the first drive gear 640*a* and the second drive gear 640*b*. In some embodiments, the first drive gear 640*a* and the second drive gear 640*b* may be selectively activated by the gearbox 622. In some embodiments, the gearbox 622 may include a first idler gear 642*a* coupled to the first drive gear 640*a* such that the first idler gear 642*a* may be activated when the first drive gear 640*a* is activated, and the gearbox 622 may include a first driven gear 644*a* that may be activated when the first idler gear 642*a* is activated. In some embodiments, the gearbox 622 may include a second idler gear 642*b* that may be activated when the second drive gear 640*b* is activated, a second driven gear 644*b* that may be activated when the second idler gear 642*b* is activated, and/or a third driven gear 644*c* that may be activated when the second idler gear 642*b* is activated. In some embodiments, the drive gears 640, the idler gears 642, and/or the driven gears 644 may include herringbone gears, helical gears, spur gears, bevel gears, and/or worm gears, among other suitable gears.

In some embodiments, the gearbox 622 may activate the first drive gear 640*a*, the first idler gear 642*a*, and the first driven gear 644*a* only in a driving mode of the vehicle. In these and other embodiments, during driving operations, the shifter assembly 646 may couple the first drive gear 640*a* to the through shaft 636 such that rotation of the through shaft 636 may activate the first drive gear 640*a* thereby activating the first idler gear 642*a* and the first driven gear 644*a*. The first driven gear 644*a* may be coupled to the transmission 618 such that first driven gear 644*a* may transfer power to the transmission 618. Thus, during the driving mode, the through shaft 636 may transfer at least a portion of the power generated by the engine to a first set of gears (e.g., the first drive gear 640*a*, the first idler gear 642*a*, and the first driven gear 644*a*), and the first set of gears may transfer power to the transmission 618.

In some embodiments, the through shaft 636 may transfer power to the equipment coupled to the through shaft 636 in the driving mode. In some embodiments, the through shaft 636 may not transfer power to the equipment coupled to the through shaft 636 in the driving mode (e.g., due to a clutch being disengaged downstream of the gearbox 622).

In some embodiments, the gearbox 622 may activate the second drive gear 640*b*, the second idler gear 642*b*, the second driven gear 644*b*, and/or the third driven gear 644*c* when the vehicle is not in the driving mode. For example, the gearbox 622 may activate the second drive gear 640*b*, the second idler gear 642*b*, the second driven gear 644*b*, and/or the third driven gear 644*c* only during non-driving operations. In these and other embodiments, during non-driving operations, the shifter assembly 646 may couple the second drive gear 640*b* to the through shaft 636 such that rotation of the through shaft 636 may activate the second drive gear 640*b* thereby activating the second idler gear 642*b*, the second driven gear 644*b*, and/or the third driven gear 644*c*. The second driven gear 644*b* and/or the third driven gear 644*c* may be coupled to equipment (e.g., via a power takeoff 628) such that the second driven gear 644*b* and/or the third driven gear 644*c* may transfer power to the equipment. Thus, during non-driving operations, the through shaft 636 may transfer at least a portion of the power generated by the engine to a second set of gears (e.g., the second drive gear 640*b* the second idler gear 642*b*, the second driven gear 644*b*, and/or the third driven gear 644*c*), and the second set of gears may transfer power to the equipment.

In these and other embodiments, the first drive gear 640*a* and the second drive gear 640*b* may be selectively coupled to the through shaft 636 via the shifter assembly 646. Thus, the shifter assembly 646 may selectively activate the first drive gear 640*a* and the second drive gear 640*b* depending on whether driving operations or non-driving operations are to be performed by the vehicle.

As illustrated in FIGS. 6C and 6D, the shifter assembly 646 may include an actuator 648, a sleeve 650, a rod 652, a fork 654, and a hub 656. The actuator 648 may activate the rod 652 such that the rod 652 may be axially translated in a first direction towards the first drive gear 640*a* and axially translated in a second direction towards the second drive gear 640*b*. For example, the actuator 648 may cause the rod 652 to be axially extended out of the sleeve 650 in the first direction and be axially retracted into the sleeve 650 in the second direction. In some embodiments, the actuator 648 may be a mechanical actuator, a hydraulic actuator, a pneumatic actuator, an electric actuator, among other actuators.

In some embodiments, the fork 654 may be coupled to the rod 652 and to the hub 656, and the hub 656 may be coupled with the through shaft 636. In these and other embodiments, the axial translation of the rod 652 may cause the hub 656 to be axially translated along the through shaft 636. For example, movement of the rod 652 in the first direction may cause the hub 656 to be axially translated toward the first drive gear 640*a*, and movement of the rod 652 in the second direction may cause the hub 656 to be axially translated toward the second drive gear 640*b*.

In some embodiments, the hub 656 may include an internal space sized and configured to be coupled to the through shaft 636 such that the hub 656 may be activated in response to rotation of the through shaft 636. For example, the through shaft 636 may be rotated in response to obtaining power from the engine, and the hub 656 may rotate due to the rotation of the through shaft 636. In these and other embodiments and as illustrated in FIG. 6D, each drive gear 640 may include an internal space sized and configured to receive the hub 656. In these and other embodiments, the drive gear 640 may be activated when the internal space receives the hub 656 and the hub 656 is activated. For example, the first drive gear 640*a* may be activated when the internal space of the first drive gear 640*a* receives the hub 656, and the second drive gear 640*b* may be activated when the internal space of the second drive gear 640*b* receives the hub 656.

In some embodiments, to perform driving operations, the shifter assembly 646 may shift the hub 656 in the first direction towards the first drive gear 640*a* such that the hub 656 may activate the first drive gear 640*a*. In these and other embodiments, as the through shaft 636 obtains power from the engine, the through shaft 636 may rotate causing the hub 656 to rotate, thereby activating the first drive gear 640*a* and the gears coupled to the first drive gear 640*a*. In some embodiments, the second drive gear 640*b* may be bypassed during driving operations such that the equipment coupled to gearbox 622 via the power takeoffs 628 may not obtain power from the engine and may not be operated.

In some embodiments, to perform non-driving operations, the shifter assembly 646 may shift the hub 656 in the second direction towards the second drive gear 640*b* such that the hub 656 activates the second drive gear 640*b*. In these and other embodiments, as the through shaft 636 obtains power from the engine, the through shaft 636 may rotate causing the hub 656 to rotate, thereby activating the second drive gear 640*b* and the gears coupled to the second drive gear 640*b*. In some embodiments, the first drive gear 640*a* may be bypassed during non-driving operations such that the transmission 618 may not obtain power from the engine and may not be operated.

Returning to FIGS. 6A and 6B, in some embodiments, the driven gears 644 may each be coupled to one or more of the power takeoffs 628. For example, the second driven gear 644*b* may be coupled to a first power takeoff 628*a* and a third power takeoff 628*c*, and/or the third driven gear 644*c* may be coupled to a second power takeoff 628*b* and a fourth power takeoff 628*d*. As another example, the first driven gear 644*a* may be coupled to a fifth power takeoff (not expressly illustrated). In these and other embodiments, the activation of a driven gear 644 may activate the power takeoffs 628 coupled to the driven gear 644. For example, activation of the second driven gear 644*b* may activate the first power takeoff 628*a* and the third power takeoff 628*c*.

In some embodiments, equipment may be coupled to the power takeoffs 628. For example, first equipment may be coupled to the first power takeoff 628*a*, second equipment may be coupled to the second power takeoff 628*b*, third equipment may be coupled to the third power takeoff 628*c*, and/or fourth equipment may be coupled to the fourth power takeoff 628*d*. In these and other embodiments, the equipment coupled to the power takeoffs 628 may be the same type or a different type. For example, the equipment coupled to the power takeoffs 628 may be all pumps, all compressors, a mix of pumps and compressors, other equipment, or a mix of pumps, compressors, and/or other equipment. In some embodiments, at least one of the power takeoffs 628 may be coupled to equipment and/or at least one of the other power takeoffs 628 may not be coupled to equipment. For example, the first power takeoff 628*a* may be coupled to equipment, but the third power takeoff 628*c* may be capped. In these and other embodiments, the activation of the driven gears 644 may activate the power takeoffs 628 coupled to the activated driven gears. In some embodiments, the power takeoffs 628 coupled to the equipment may be activated by the gearbox 622 only during non-driving operations.

Thus, the gearbox 622 may selectively activate the first set of gears (e.g., the first drive gear 640*a*, the first idler gear 642*a*, and the first driven gear 644*a*) and the second set of gears (e.g., the second drive gear 640*b*, the second idler gear 642*b*, the second driven gear 644*b*, and/or the third driven gear 644*c*) depending on whether driving operations or non-driving operations are to be performed by the vehicle. In these and other embodiments, the transmission 618 may be bypassed during non-driving operations, which may increase power efficiency by reducing power losses, may decrease downtime due to transmission 618 maintenance and/or repair, and may reduce fuel consumption.

Modifications, additions, or omissions may be made to the gearbox 622 without departing from the scope of the present disclosure. For example, one skilled in the art would appreciate that the gearbox 622 may include components other than those expressly illustrated in the FIGS. 6A-6D. In some embodiments, each of the power takeoffs 628 may be coupled to equipment or at least one of the power takeoffs 628 may not be coupled to equipment. In some embodiments, the gearbox 622 may include more or less drive gears 640, idler gears 642, and/or driven gears 644. In some embodiments, the through shaft 636 may be omitted. In some embodiments, the second drive gear 640*b*, the second idler gear 642*b*, the second driven gear 644*b*, and/or the third driven gear 644*c* may be omitted.

Figure 7A:
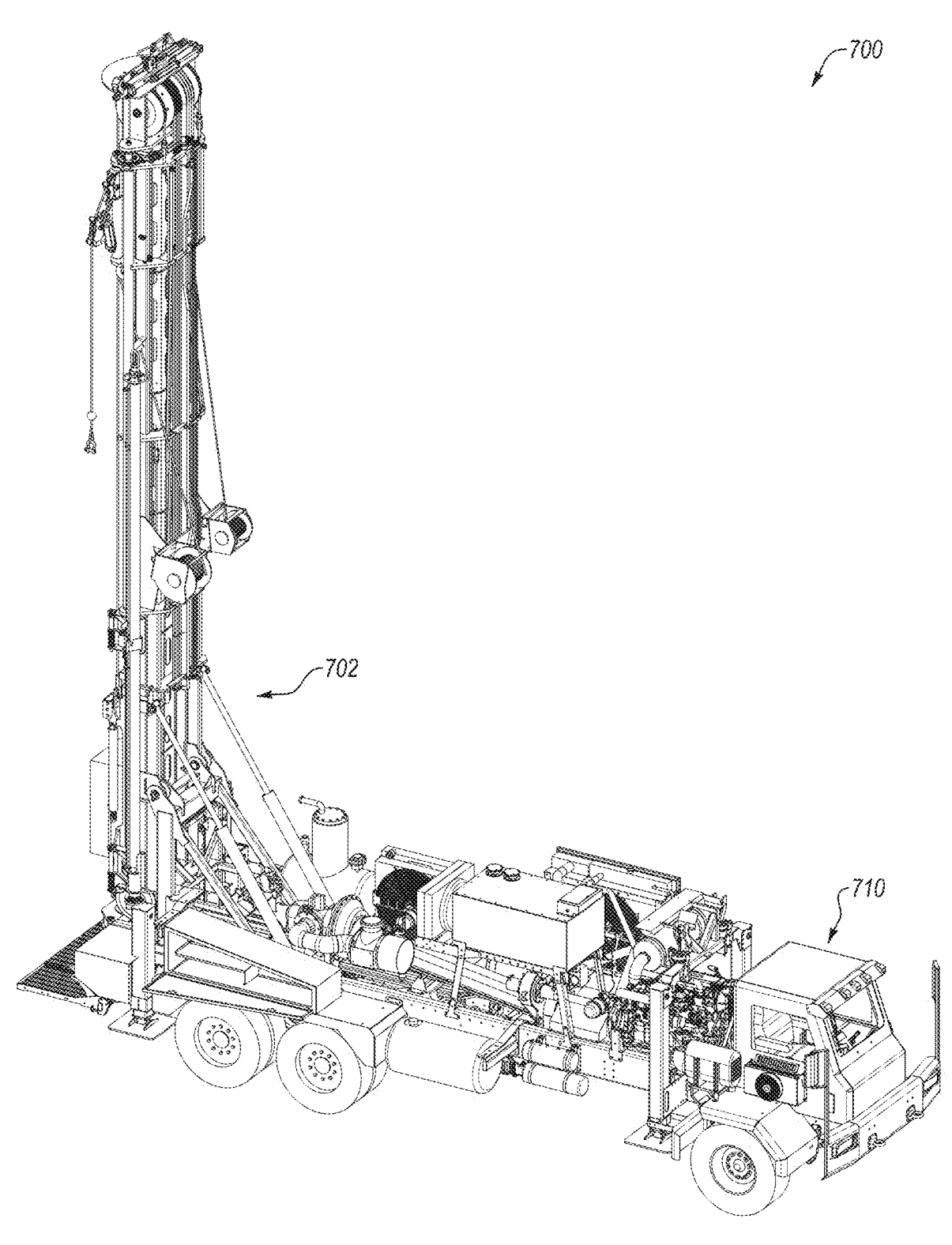
FIG. 7A illustrates a perspective view of a multi-functional vehicle configured to perform rig operations.
Figure 7B:
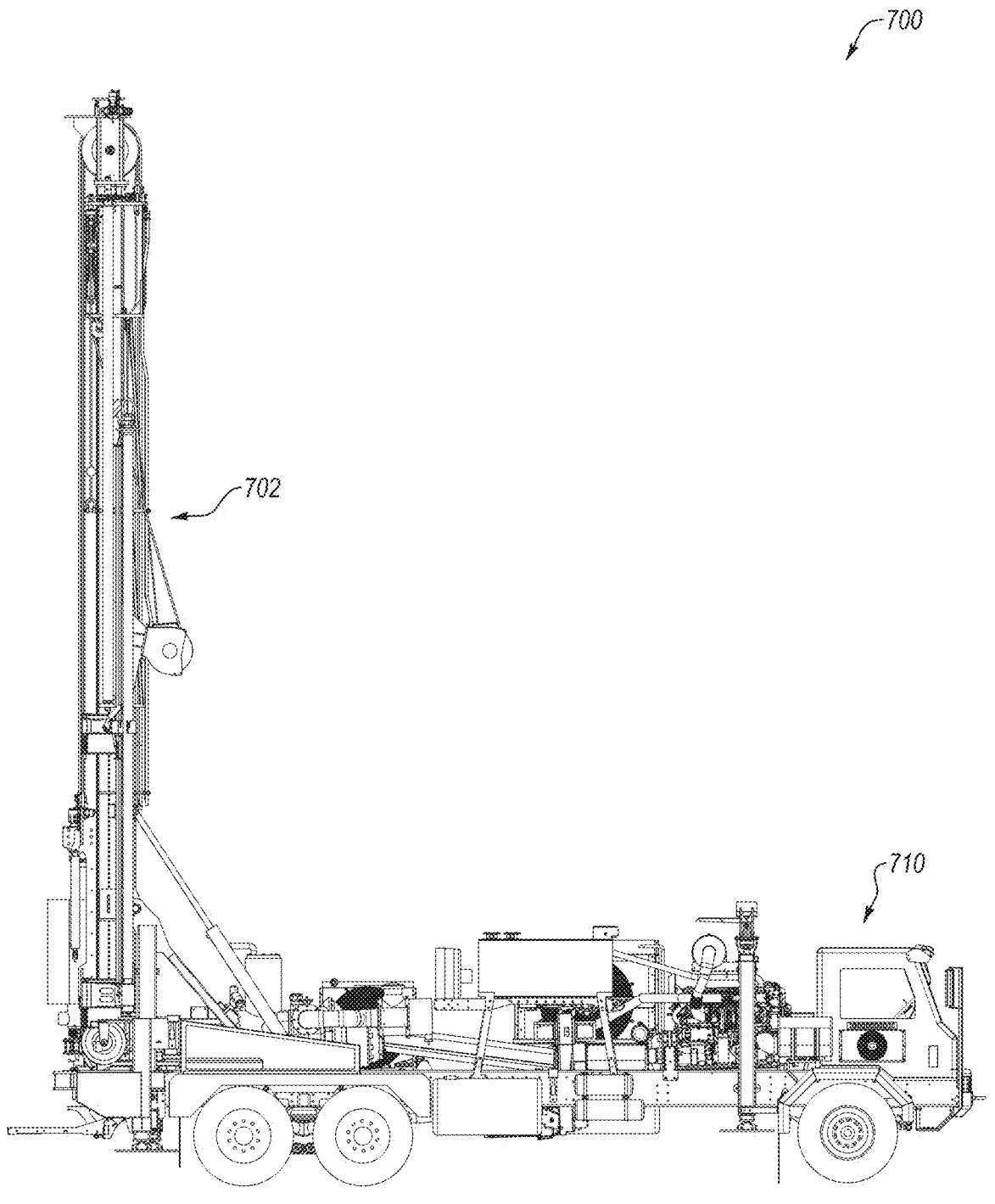
FIG. 7B illustrates a side view of the multi-functional vehicle of FIG. 7A.
Figure 7C:
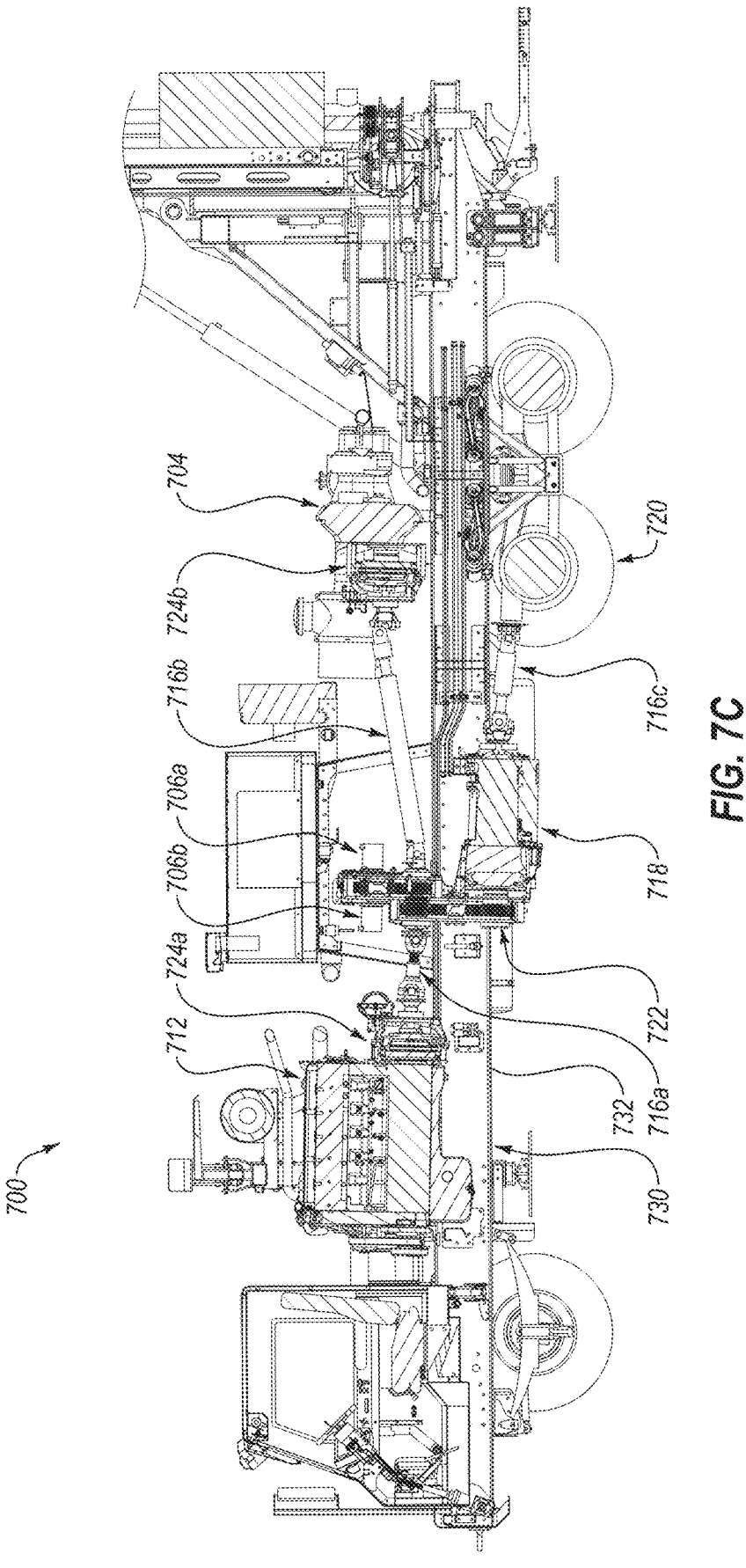
FIG. 7C illustrates a partial-section view of the multi-functional vehicle of FIG. 7A.

FIG. 7A illustrates a perspective view of a multi-functional vehicle 700 configured to perform rig operations. FIGS. 7B and 7C respectively illustrate a side view and a partial-section view of the multi-functional vehicle 700 of FIG. 7A. The multi-functional vehicle 700 may include a vehicle 710 and rig equipment 702. In some embodiments and as illustrated in FIGS. 7A-7C, the rig equipment 702 may be mounted to the vehicle 710 such that the vehicle 710 may transport the rig equipment 702 during driving operations and operate the rig equipment 702 during non-driving operations. The rig equipment 702 may include any equipment used to perform operations with respect to a wellbore used for extracting natural resources (e.g., a wellbore corresponding to a water well, a gas well, an oil well, a gas condensate well, a hydrogen well, a geothermal well, and/or other wells corresponding to natural resources). The vehicle 710 may be similar to and function in a similar manner to the vehicles described throughout this disclosure.

As illustrated in FIGS. 7A and 7B, the rig equipment 702 may include various types of rig equipment 702. In some embodiments, the rig equipment 702 may include fluid handling equipment (e.g., pumps, compressors, mixers, agitators, and/or other fluid handling equipment), hoisting equipment (e.g., masts, drawworks, winches, booms, and/or other hoisting equipment), rotary equipment (e.g., top drives, rotary tables, and/or other rotary equipment), safety equipment, electrical equipment (e.g., generators), and/or support equipment (e.g., rig electrical systems), among other rig equipment. In some embodiments, at least a portion of the rig equipment 702 may be powered by the vehicle 710. In these and other embodiments, some of the rig equipment 702 may not be powered by the vehicle 710. For example, some rig equipment 702 may not require power (e.g., tanks) and/or some rig equipment 702 may have auxiliary power sources (e.g., a second engine separate from the vehicle 710).

As illustrated in FIG. 7C, the rig equipment 702 may include a compressor 704, a first pump 706*a*, and a second pump 706*b*. The compressor 704 may pressurize air that may be used to evacuate cuttings from the wellbore during drilling operations, among other rig operations. The first pump 706*a* and/or the second pump 706*b* may be hydraulic pumps that may be used to operate various components of the rig. For example, as illustrated in FIGS. 7A and 7B, the mast of the rig may have a hydraulic arms coupled to the mast that may raise and lower the mast, and the first pump 706a and the second pump 706b may be used to activate the hydraulic arms (e.g., through pressurizing hydraulic oil) to raise and lower the mast. Thus, the first pump 706a and/or the second pump 706b may be used to raise and position the mast over the wellbore and may be used to lower the mast for transport by the vehicle 710.

In some embodiments, the vehicle 710 may include an engine 712, one or more drivetrains 716, a transmission 718, wheels 720, a gearbox 722, and/or one or more clutches 724, and/or a chassis 730 having one or more frame rails 732, among other vehicular components, which may be similar to and function similarly to similarly named components described throughout this disclosure.

In some embodiments, the vehicle 710 may include the rig equipment 702. For example, the vehicle 710 may include the compressor 704, the first pump 706a, and/or the second pump 706b, among other rig equipment. In these and other embodiments, the rig equipment 702 may be coupled to the vehicle 710 via the chassis 730 (e.g., via the frame rails 732 and/or crossmembers between the frame rails 732). For example, as illustrated in FIG. 7C, the compressor 704 may be mounted to the frame rail 732 and/or positioned above the frame rail 732, and the first pump 702a and the second pump 702b may be coupled to the gearbox 722, which may be coupled to the chassis 730.

In some embodiments, the rig equipment 702 may be operated by the power generated via the engine 712. In these and other embodiments, power generated by the engine 712 may be transferred to the gearbox 722 via a first drivetrain 716a. In some embodiments, the engine 712 may be selectively coupled with the gearbox 722 via a first clutch 724a.

In some embodiments, the gearbox 722 may transfer power to the transmission 718 only when the vehicle 710 is in driving mode. For example, the gearbox 722 may activate a first set of gears corresponding to the driving mode that may transfer at least a portion of the power to the transmission 718 such that the wheels 720 may be propelled. In these and other embodiments, the transmission 718 may transfer the power to the wheels 720 (e.g., the rear wheels) via a third drivetrain 716c.

In some embodiments, the gearbox 722 may transfer power to at least a portion of the rig equipment 702 when the vehicle is in driving mode. For example, the compressor 704 may be direct drive equipment and may be operated during driving operations and non-driving operations. For instance, a second drivetrain 716b may transfer power from the gearbox 722 to the compressor 704 in driving mode and/or when the vehicle 710 is not in driving mode. In these and other embodiments, the compressor 704 may be selectively coupled with the gearbox 722 (and thereby the engine 712) via a second clutch 724b. Thus, the second clutch 724b may selectively couple the engine 712 and the compressor 704 such that the compressor 704 may not obtain power and may not be operated during driving operations and/or during non-driving operations. As a result, the second clutch 724b may allow the compressor 704 to not be operated during driving operations and/or to not be operated during non-driving operations that do not require compression. For example, during driving and/or during some rig operations (e.g., raising or lowering the mast), the compressor 704 may not need to be operated.

In some embodiments, the gearbox 722 may transfer power to the rig equipment 702 when the vehicle 710 is not in driving mode. In some embodiments, during rig operations (e.g., drilling operations), the gearbox 722 may activate a second set of gears to operate the first pump 706a and/or the second pump 706b. For example, the gearbox 722 may transfer power to the first pump 706a and/or the second pump 706b to raise the mast and/or to operate other equipment. In these and other embodiments, the gearbox 722 may transfer power to the compressor 704 via the second drivetrain 716b such that the compressor 704 may be operated.

As illustrated in FIG. 7C, the engine 712 may be mounted to the chassis 730 of the vehicle 710 such that the engine 712 is positioned at or above the chassis 730. In these and other embodiments, the engine 712 may be at least partially aligned with the rig equipment 702 such that there may be less vector changes in the power distribution to the rig equipment 702. In some embodiments, the rig equipment 702 with the highest power consumption may be most aligned with the engine 712. For example, the compressor 704 may be the rig equipment 702 that consumes the most power during non-driving operations and may be most-aligned—as compared to other rig equipment and the transmission 718—with the engine 712 such that there may be less power losses due to vector changes in the operation of the compressor 704. In some embodiments, the compressor 704 may be coupled to the gearbox 722 via a through shaft such that there may not be power losses due to gear meshing in distributing the power to the compressor 704.

In an example operation of the multi-functional vehicle 700, the vehicle 710 may be driven to a location where rig operations may be desired. While driving, the rig equipment 702 may not be operated. For example, the gearbox 722 may bypass the rig equipment 702 (e.g., the pumps 706) and/or the rig equipment 702 may not be coupled to the engine 712 (e.g., via a clutch). When rig operations are to be performed, the gearbox 722 may bypass the transmission 718 such that the mast may be raised, the mast may be centered over the wellbore, and drilling operations (or other rig operations) may be commenced. During the performance of rig operations, the transmission 718 may not obtain power from the engine 712. As the multi-functional vehicle 700 may spend days, weeks, or even months at the location, bypassing the transmission 718, which may reduce the runtime of the transmission 718 by days, weeks, or months thereby reducing the amount of wear on the transmission 818 and potentially extending the time between failures of the transmission 718. Furthermore, because the transmission 718 is bypassed, power losses may be reduced, which may result in a more environmentally friendly multi-functional vehicle 700 by reducing fuel consumption.

Modifications, additions, or omissions may be made to the multi-functional vehicle 700 without departing from the scope of the present disclosure. For example, one skilled in the art would appreciate that the vehicle 710 may include vehicular components other than those expressly illustrated in the FIG. 7. In some embodiments, the vehicle 710 may include an additional engine to power at least some of the rig equipment 702. Furthermore, the multi-functional vehicle 700 is shown as being used in the performance of rig operations. However, the multi-functional vehicle 700 may be configured equipment other than rig equipment 702 to perform other operations.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A vehicle comprising:
an engine configured to generate power;
rig equipment mounted to the vehicle and configured to obtain the power from the engine to operate the rig equipment, the rig equipment configured to perform subterranean operations;
a transmission configured to obtain the power from the engine to propel wheels of the vehicle; and
a power distribution system coupled between the engine and the transmission and coupled between the engine and the rig equipment, the power distribution system including:
a through-shaft configured to couple the engine to at least a portion of the rig equipment; and
a gearbox that includes a first set of gears configured to be selectively coupled to the through-shaft, the first set of gears coupled to the transmission and configured to provide the power from the engine to the transmission by way of the through-shaft and the first set of gears,
the power generated by the engine being transferred to the at least a portion of the rig equipment via the through-shaft and not via gearing included in the gearbox.

2. The vehicle of claim 1, wherein the gearbox includes a second set of gears configured to be selectively coupled to the through-shaft, the second set of gears coupled to at least a second portion of the rig equipment and configured to provide the power from the engine to the at least a second portion of the rig equipment by way of the through-shaft and the second set of gears.

3. The vehicle of claim 1, wherein the first set of gears is configured to be selectively coupled to the through-shaft only during a driving mode of the vehicle.

4. The vehicle of claim 3, wherein the gearbox includes a second set of gears configured to be selectively coupled to the through-shaft only during a non-driving mode of the vehicle such that only one of the first set of gears and the second set of gears is coupled to the through-shaft at any given time.

5. The vehicle of claim 4, wherein the second set of gears includes:
a drive gear, the drive gear being activated by the power generated by the engine;
an idler gear, the idler gear being activated by the drive gear; and
a driven gear, the driven gear being activated by the idler gear, the vehicle further comprising a plurality of power take-offs, a first power takeoff of the plurality of power takeoffs coupling a first portion of the rig equipment to the gearbox and a second power takeoff of the plurality of power takeoffs coupling a second portion of the rig equipment to the gearbox, at least one of the first power takeoff or the second power takeoff being coupled to the driven gear such that the at least one of the first power takeoff or the second power takeoff is activated by the driven gear.

6. The vehicle of claim 4, wherein the second set of gears is coupled to at least a second portion of the rig equipment and configured to provide the power from the engine to the at least a second portion of the rig equipment by way of the through-shaft and the second set of gears.

7. The vehicle of claim 6, further comprising a first clutch positioned between the through-shaft and the at least a portion of the rig equipment, the first clutch configured to selectively couple the at least a portion of the rig equipment and the through-shaft.

8. The vehicle of claim 7 further comprising a second clutch positioned between the engine and the power distribution system.

9. The vehicle of claim 6, further comprising a third clutch positioned between the second set of gears and the at least a second portion of the rig equipment.

10. The vehicle of claim 1, the vehicle further includes a chassis, the engine being mounted above the chassis.

11. A vehicle comprising:

an engine configured to generate power;

rig equipment mounted to the vehicle and configured to obtain the power from the engine to operate the rig equipment, the rig equipment configured to perform subterranean operations;

a transmission selectively coupled with the engine so that the transmission only receives power from the engine during a driving mode of the vehicle; and a power distribution system including:

a through-shaft configured to couple the engine to at least a portion of the rig equipment; and a gearbox that includes a first set of gears configured to be selectively coupled to the through-shaft only during the driving mode of the vehicle, the first set of gears coupled to the transmission and configured to provide the power from the engine to the trans-mission by way of the through-shaft and the first set of gears, the power generated by the engine being transferred to the at least a portion of the rig equipment via the through-shaft and not via gearing included in the gearbox.

12. The vehicle of claim 11, wherein the gearbox includes a second set of gears configured to be selectively coupled to the through-shaft, the second set of gears coupled to at least a second portion of the rig equipment and configured to provide the power from the engine to the at least a second portion of the rig equipment by way of the through-shaft and the second set of gears.

13. The vehicle of claim 12, wherein the second set of gears is configured to be selectively coupled to the through-shaft only during a non-driving mode of the vehicle such that only one of the first set of gears and the second set of gears is coupled to the through-shaft at any given time.

14. The vehicle of claim 13, wherein the second set of gears includes:

a drive gear, the drive gear being activated by the power generated by the engine;

an idler gear, the idler gear being activated by the drive gear; and a driven gear, the driven gear being activated by the idler gear, the vehicle further comprising a plurality of power take-offs, a first power takeoff of the plurality of power takeoffs coupling a first portion of the rig equipment to the gearbox and a second power takeoff of the plurality of power takeoffs coupling a second portion of the rig equipment to the gearbox, at least one of the first power takeoff or the second power takeoff being coupled to the driven gear such that the at least one of the first power takeoff or the second power takeoff is activated by the driven gear.

15. The vehicle of claim 12, further comprising a first clutch positioned between the through-shaft and the at least the portion of the rig equipment, the first clutch configured to selectively couple the at least the portion of the rig equipment and the through-shaft.

16. The vehicle of claim 12, further comprising a second clutch positioned between the engine and the power distri-bution system.

17. The vehicle of claim 16, further comprising a third clutch positioned between the second set of gears and the at least the second portion of the rig equipment.

18. The vehicle of claim 11, the vehicle further includes a chassis, the engine being mounted above the chassis.

* * * * *